(12) United States Patent
Lee et al.

(10) Patent No.: US 12,537,032 B2
(45) Date of Patent: Jan. 27, 2026

(54) MEMORY CELL ARRAY INCLUDING PARTITIONED DUAL LINE STRUCTURE AND DESIGN METHOD THEREOF

(71) Applicant: SAMSUNG ELECTRONICS CO., LTD., Suwon-si (KR)

(72) Inventors: Inhak Lee, Suwon-si (KR); Jaesung Choi, Suwon-si (KR); Sangyeop Baeck, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 567 days.

(21) Appl. No.: 18/052,412

(22) Filed: Nov. 3, 2022

(65) Prior Publication Data
US 2023/0144938 A1    May 11, 2023

(30) Foreign Application Priority Data

Nov. 10, 2021  (KR) .................. 10-2021-0154273
Apr. 15, 2022  (KR) .................. 10-2022-0047184

(51) Int. Cl.
*G11C 5/06*     (2006.01)
*G11C 11/412*   (2006.01)
(Continued)

(52) U.S. Cl.
CPC ............ *G11C 5/06* (2013.01); *G11C 11/412* (2013.01); *H01L 23/5226* (2013.01); *H01L 23/5283* (2013.01); *H10B 10/00* (2023.02)

(58) Field of Classification Search
CPC ......... G11C 5/06; G11C 11/412; H10B 10/00; H01L 23/5226; H01L 23/5283
(Continued)

(56) References Cited

U.S. PATENT DOCUMENTS 9,230,969 B2   1/2016  Tsuboi
9,460,778 B2  10/2016  Son et al.
(Continued)

FOREIGN PATENT DOCUMENTS

KR  10-2017-0090982 A   8/2017
KR     10-1986416 B1    6/2019

OTHER PUBLICATIONS

Communication issued Sep. 12, 2025 by the Korean Intellectual Property Office in Korean Patent Application No. 10-2022-0047184.

*Primary Examiner* — Tu-Tu V Ho
(74) *Attorney, Agent, or Firm* — Sughrue Mion, PLLC

(57) ABSTRACT

An integrated circuit includes is provided. The integrated circuit includes: a plurality of bit lines spaced apart from each other along a first direction and extending in a second direction perpendicular to the first direction through a first sub-array and a second sub-array neighboring the first sub-array in the second direction. Each of the plurality of bit lines includes: a first metal wiring extending in the second direction, the first metal wiring including a first portion and a second portion that is separated from the first portion by a first cutting portion; a third metal wiring extending in the second direction, and at least partially overlapping the first metal wiring along a third direction perpendicular to the first direction and the second direction; and two bridges electrically connecting the first metal wiring to the third metal wiring.

20 Claims, 38 Drawing Sheets

(51) Int. Cl.
  *H01L 23/522* (2006.01)
  *H01L 23/528* (2006.01)
  *H10B 10/00* (2023.01)

(58) Field of Classification Search
  USPC .......................................................... 257/600
  See application file for complete search history.

(56) References Cited

U.S. PATENT DOCUMENTS

| | | |
|---|---|---|
| 10,176,863 B2 | 1/2019 | Liaw |
| 10,783,938 B2 | 9/2020 | Katoch et al. |
| 2017/0256306 A1* | 9/2017 | Liaw .................... G11C 11/419 |
| 2021/0104530 A1 | 4/2021 | Liaw |
| 2021/0134371 A1 | 5/2021 | Clinton et al. |

* cited by examiner

MEMORY CELL ARRAY INCLUDING PARTITIONED DUAL LINE STRUCTURE AND DESIGN METHOD THEREOF

CROSS-REFERENCE TO RELATED APPLICATIONS

This application is based on and claims priority under 35 U.S.C. § 119 to Korean Patent Application No. 10-2021-0154273, filed on Nov. 10, 2021, in the Korean Intellectual Property Office, and Korean Patent Application No. 10-2022-0047184, filed on Apr. 15, 2022, in the Korean Intellectual Property Office, the disclosures of which are incorporated by reference herein in their entireties.

BACKGROUND

The present disclosure relates to a memory cell array and a design method thereof, and more particularly, to a layout of a memory cell array including a partitioned dual line structure.

Technology related to semiconductor devices has continuously and remarkably developed worldwide due to the active demands of semiconductor users and the ceaseless efforts of semiconductor manufacturers. Furthermore, semiconductor manufacturers not satisfied with the current technology have strived to make semiconductor devices more miniaturized, highly integrated, and of large capacity, and have spurred research and development to achieve a higher operation speed while performing more stable and smooth operation. The above efforts of semiconductor manufacturers have brought advances in micro process technology, micro device technology, and circuit design technology, so that significant achievements have been obtained in the technology of semiconductor memory cells, such as dynamic random access memory (DRAM) or static random access memory (SRAM).

SUMMARY

One or more embodiments provide an integrated circuit in which the resistance and capacitance of a memory cell array are reduced, by implementing a memory cell array including at least one of a partitioned dual bit line structure, a partitioned dual power line structure, and a partitioned dual word line structure.

The technical objectives to be achieved by the disclosure are not limited to the above-described objectives, and other technical objectives that are not mentioned herein would be clearly understood by a person skilled in the art.

According to an aspect of an embodiment, an integrated circuit includes: a plurality of bit lines spaced apart from each other along a first direction and extending in a second direction perpendicular to the first direction through a first sub-array and a second sub-array neighboring the first sub-array in the second direction. Each of the plurality of bit lines includes: a first metal wiring extending in the second direction, the first metal wiring including a first portion and a second portion that is separated from the first portion by a first cutting portion; a third metal wiring extending in the second direction, and at least partially overlapping the first metal wiring along a third direction perpendicular to the first direction and the second direction; and two bridges electrically connecting the first metal wiring to the third metal wiring.

According to an aspect of an embodiment, an integrated circuit includes: a first sub-array including a first structure that includes a static random access memory (SRAM) cell and a second structure; a second sub-array neighboring the first sub-array; a multiplexer portion configured to transmit signals to the first sub-array and the second sub-array according to a column address and a sub-array address; a plurality of first metal wirings spaced apart from each other along a first direction, and extending through the first structure and the second structure in a second direction perpendicular to the first direction, each of the plurality of first metal wirings including a first portion and a second portion that is separated from the first portion by a first cutting portion; a third metal wiring formed above the plurality of first metal wirings and extending in the second direction through the first structure and the second structure, and at least partially overlapping the plurality of first metal wirings along a third direction perpendicular to the first direction and the second direction; and a first bridge formed in the second structure between the plurality of first metal wirings and the third metal wiring, and electrically connecting the plurality of first metal wirings to the third metal wiring.

According to an aspect of an embodiment, an integrated circuit includes: a first metal wiring of a word line extending in a first direction through a first segment and a second segment of the integrated circuit, the first metal wiring including a first portion and a second portion that is separated from the first portion by a first cutting portion; a second metal wiring of the word line extending in the first direction, and at least partially overlapping the first metal wiring along a second direction perpendicular to the first direction; and two bridges formed in a stack structure between the first metal wiring and the second metal wiring, and electrically connecting the first metal wiring to the second metal wiring at both ends of the second segment.

BRIEF DESCRIPTION OF DRAWINGS

The above and other objects and features will be more clearly understood from the following description of embodiments, taken in conjunction with the accompanying drawings, in which.

DETAILED DESCRIPTION

Figure 1:
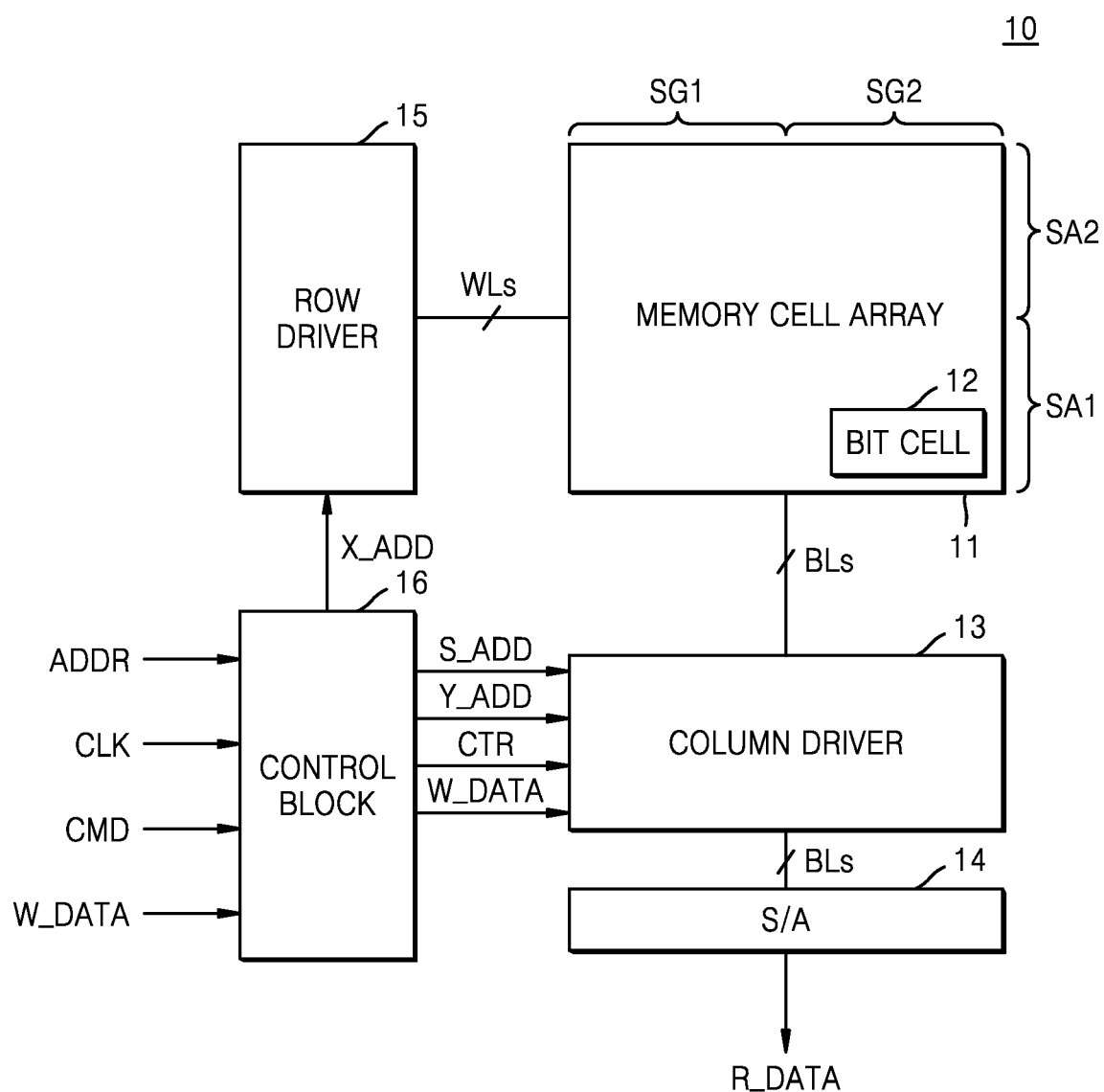
FIG. 1 is a block diagram of an integrated circuit (IC) according to some embodiments.

Hereinafter, various embodiments described with the accompanying drawings. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure. On a plane of a layout diagram, a horizontal direction and a vertical direction are defined as a first direction X and a second direction Y, respectively, and a direction substantially perpendicular to the layout diagram is defined as a third direction Z. Accordingly, the second direction Y may indicate a direction perpendicular to the first direction X. A direction indicated by an arrow on the drawings and the opposite direction thereof will be described as the same direction. The definitions of the above-described directions are identical in all drawings. In the drawings, for convenience of illustration, only some components may be illustrated. In the description with reference to the drawings, the same or corresponding constituents are indicated by the same reference numerals and redundant descriptions thereof are omitted. Furthermore, a number, for example, first, second, and the like, used in the description of an embodiment is merely an identification sign to distinguish one constituent element from another constituent element. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

FIG. 1 is a block diagram of an integrated circuit (IC) 10 according to some embodiments.

Referring to FIG. 1, the IC 10 may receive an address ADDR, a clock signal CLK, a command CMD, and write data W_DATA. For example, the IC 10 may receive the command CMD to write (referred to as a "write command"), the address ADDR where the write data W_DATA is to be stored (referred to as a "write address"), and the write data W_DATA, and store the write data W_DATA in a target area of a memory cell array 11 corresponding to the write address. Furthermore, the IC 10 may receive the command CMD to read (referred to as a "read command") and the address ADDR where read data R_DATA is stored (referred to as a "read address"), and output to the outside the read data R_DATA stored in a target area of the memory cell array 11 corresponding to the read address.

The memory cell array 11 may include a plurality of bit cells 12. The bit cells 12 may be arranged at regular intervals in the memory cell array 11. The bit cells 12 may be arranged at points where word lines WLs intersects the bit lines BLs. Each of the bit cells 12 may be connected to at least one of the word lines WLs, and at least one of the bit lines BLs.

Each of the bit cells 12 may be a memory cell. For example, each of the bit cells 12 may be a volatile memory cell, such as dynamic random access memory (DRAM) and the like, or a static random access memory (SRAM) cell. Alternatively, for example, each of the bit cells 12 may be dual port SRAM (DPSRAM) that simultaneously performs a write operation and a read operation. In some embodiments, each of the bit cells 12 may be a non-volatile memory cell, such as a flash memory, resistive random access memory (RRAM), and the like. Some embodiments will be mainly described with reference to an SRAM cell, but the disclosure is not limited thereto.

The memory cell array 11 may be classified into a first sub-array SA1 and a second sub-array SA2. The bit cells 12 may not be arranged in the boundary between the first sub-array SA1 and the second sub-array SA2. The number of word lines WLs included in the first sub-array SA1 and the number of word lines WLs included in the second sub-array SA2 may be identical to or different from each other. The IC 10 may be operated by accessing any one of the first sub-array SA1 and the second sub-array SA2. According to an embodiment, as the IC 10 accesses any one of the first sub-array SA1 and the second sub-array SA2, the resistance and capacitance of the bit lines BLs may be reduced. Accordingly, the operational characteristics of the IC 10 may be improved. However, the disclosure is not limited thereto, and the memory cell array 11 may be classified into three or more sub-arrays.

Furthermore, as described below with reference to FIGS. 24 to 38, the memory cell array 11 may be further classified into a first segment SG1 and a second segment SA2. The bit cells 12 may not be arranged in the boundary between the first segment SG1 and the second segment SG2. The number of bit lines BLs arranged in the first segment SG1 and the number of bit lines BLs arranged in the second segment SG2 may be identical to or different from each other. The IC 10 may operate by accessing any one of the first segment SG1 and the second segment SG2. However, the disclosure is not limited thereto, and the memory cell array 11 may be classified into three or more sections.

The column driver 13 may be connected to the memory cell array 11 through the bit lines BLs. The column driver 13 may select at least one bit line of the bit lines BLs based on a column address Y_ADD. The column driver 13 may select the first sub-array SA1 or the second sub-array SA2 based on a sub-array address S_ADD. The sub-array address S_ADD may be an address based on a row address X_ADD.

Figure 2:
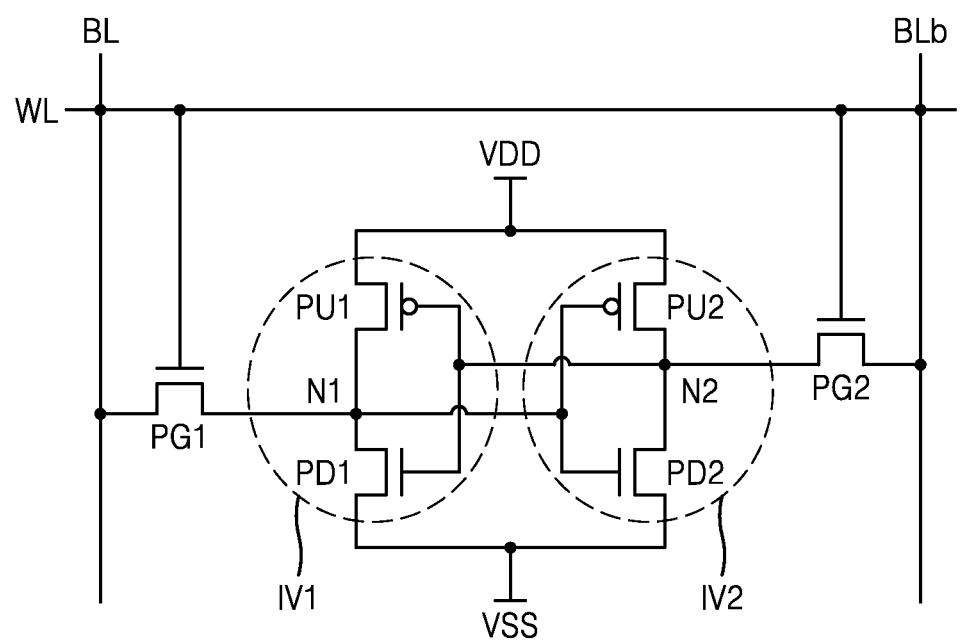
FIG. 2 is an equivalent circuit diagram of a bit cell according to an embodiment.

For example, the column driver 13 may select a bit line BL of FIG. 2 and a complementary bit line BLb of FIG. 2, which are included in the first sub-array SA1 or the second sub-array SA2, based on the column address Y_ADD and the sub-array address S_ADD. The bit line BL of FIG. 2 and the complementary bit line BLb of FIG. 2 may be connected to at least one of the bit cells 12. As the column driver 13 selects the bit line BL of FIG. 2 and the complementary bit line BLb of FIG. 2, the bit cells 12 connected to the bit line BL of FIG. 2 and the complementary bit line BLb of FIG. 2 may be selected.

The column driver 13 may perform a read operation or a write operation, based on a control signal CTR. The column driver 13 may identify values stored in the bit cells 12 connected to an activated word line, among the bit cells 12, by detecting a current and/or a voltage received through the bit lines BLs, and output the read data R_DATA based on the identified values.

Furthermore, the column driver 13 may apply a current and/or a voltage to the bit lines BLs based on the write data W_DATA, and write values to the bit cells 12 connected to the activated word lines, among the bit cells 12. According to an embodiment, the column driver 13 may include a read circuit for performing a read operation and a write circuit for performing a write operation. Additionally, the column driver 13 may include a bit line precharge circuit to precharge the bit lines BLs.

A sense amplifier 14 may amplify a difference of signals output from the column driver 13 and output the read data R_DATA.

A row driver 15 may be connected to the memory cell array 11 through the word lines WLs. The row driver 15 may activate at least one word line of the word lines WLs based on the row address X_ADD. As the row driver 15 selects at least one word line of the word lines WLs based on the row address X_ADD, the bit cells 12 connected to an activated word line may be selected from among the bit cells 12.

A control block 16 may receive the address ADDR, the clock signal CLK, the command CMD, and the write data W_DATA, and generate the row address X_ADD, the column address Y_ADD, the sub-array address S_ADD, and the control signal CTR. For example, the control block 16 may identify a read command by decoding the command CMD, and generate the row address X_ADD, the column address Y_ADD, the sub-array address S_ADD, and the control signal CTR to read the read data R_DATA from the memory cell array 11. Furthermore, the control block 16 may identify a write command by decoding the command CMD, and generate the row address X_ADD, the column address Y_ADD, the sub-array address S_ADD, and the control signal CTR to write the write data W_DATA to the memory cell array 11.

As some embodiments are mainly described with reference to an SRAM cell, each of the bit cells 12 may be connected to one word line and a pair of a bit line and a complementary bit line. In the following description, each of the bit cells 12 is described in detail.

FIG. 2 is an equivalent circuit diagram of a bit cell according to an embodiment. In detail, FIG. 2 is an equivalent circuit diagram of one of the bit cells 12 of FIG. 1. In the following description, FIG. 1 is also referred to.

Referring to FIG. 2, one of the bit cells 12 may be an SRAM cell. One of the bit cells 12 may include a first pass transistor PG1, a second pass transistor PG2, a first pull-up transistor PU1, a second pull-up transistor PU2, a first pull-down transistor PD1, and a second pull-down transistor PD2.

The first and second pass transistors PG1 and PG2 and the first and second pull-down transistors PD1 and PD2 may be N-type transistors, whereas the first and second pull-up transistors PU1 and PU2 may be P-type transistors. The first and second pass transistors PG1 and PG2 and the first and second pull-down transistors PD1 and PD2 may be an N-channel MOSFET (NFET), whereas the first and second pull-up transistors PU1 and PU2 may be a P-channel MOSFET (PFET). The first pull-up transistor PU1 and the first pull-down transistor PD1 may constitute a first inverter IV1, whereas the second pull-up transistor PU2 and the second pull-down transistor PD2 may constitute a second inverter IV2.

In detail, a drain terminal of the first pull-up transistor PU1 may be connected to a drain terminal of the first pull-down transistor PD1, and a gate of the first pull-up transistor PU1 may be electrically connected to a gate of the first pull-down transistor PD1. While a power voltage VDD may be applied to a source terminal of the first pull-up transistor PU1, a ground voltage VSS may be applied to a source terminal of the first pull-down transistor PD1. Accordingly, the first pull-up and pull-down transistors PU1 and PD1 may constitute the first inverter IV1.

Likewise, a drain terminal of the second pull-up transistor PU2 may be connected to a drain terminal of the second pull-down transistor PD2, whereas a gate of the second pull-up transistor PU2 may be electrically connected to a gate of the second pull-down transistor PD2. While the power voltage VDD may be applied to a source terminal of the second pull-up transistor PU2, the ground voltage VSS may be applied to a source terminal of the second pull-down transistor PD2. Accordingly, the second pull-up and pull-down transistors PU2 and PD2 may constitute the second inverter IV2.

The gate of the first pull-up transistor PU1 and the gate of the first pull-down transistor PD1 connected to each other may correspond to an input terminal of the first inverter IV1, whereas a first node N1 connected to a drain terminal of the first pull-up transistor PU1 and a drain terminal of the first pull-down transistor PD1 may correspond to an output terminal of the first inverter IV1.

The gate of the second pull-up transistor PU2 and the gate of the second pull-down transistor PD2 connected to each other may correspond to an input terminal of the second inverter IV2, whereas a second node N2 connected to the drain terminal of the second pull-up transistor PU2 and the drain terminal of the second pull-down transistor PD2 may correspond to an output terminal of the second inverter IV2.

The first inverter IV1 and the second inverter IV2 may be coupled to each other in a latch structure. The gate of the first pull-up transistor PU1 and the gate of the first pull-down transistor PD1 may be connected to the second node N2, whereas the gate of the second pull-up transistor PU2 and the gate of the second pull-down transistor PD2 may be connected to the first node N1.

One end of the first pass transistor PG1 may be connected to the first node N1, whereas the other end of the first pass transistor PG1 may be connected to a bit line BL. One end of the second pass transistor PG2 may be connected to the second node N2, whereas the other end of the second pass transistor PG2 may be connected to a complementary bit line BLb. A gate of the first pass transistor PG1 and a gate of the second pass transistor PG2 may be connected to a word line WL.

One of the bit cells 12 may write logic data through the first node N1 and the second node N2, or read logic data through the first node N1 and the second node N2, by using the word line WL, the bit line BL, and the complementary bit line BLb.

Figure 3:
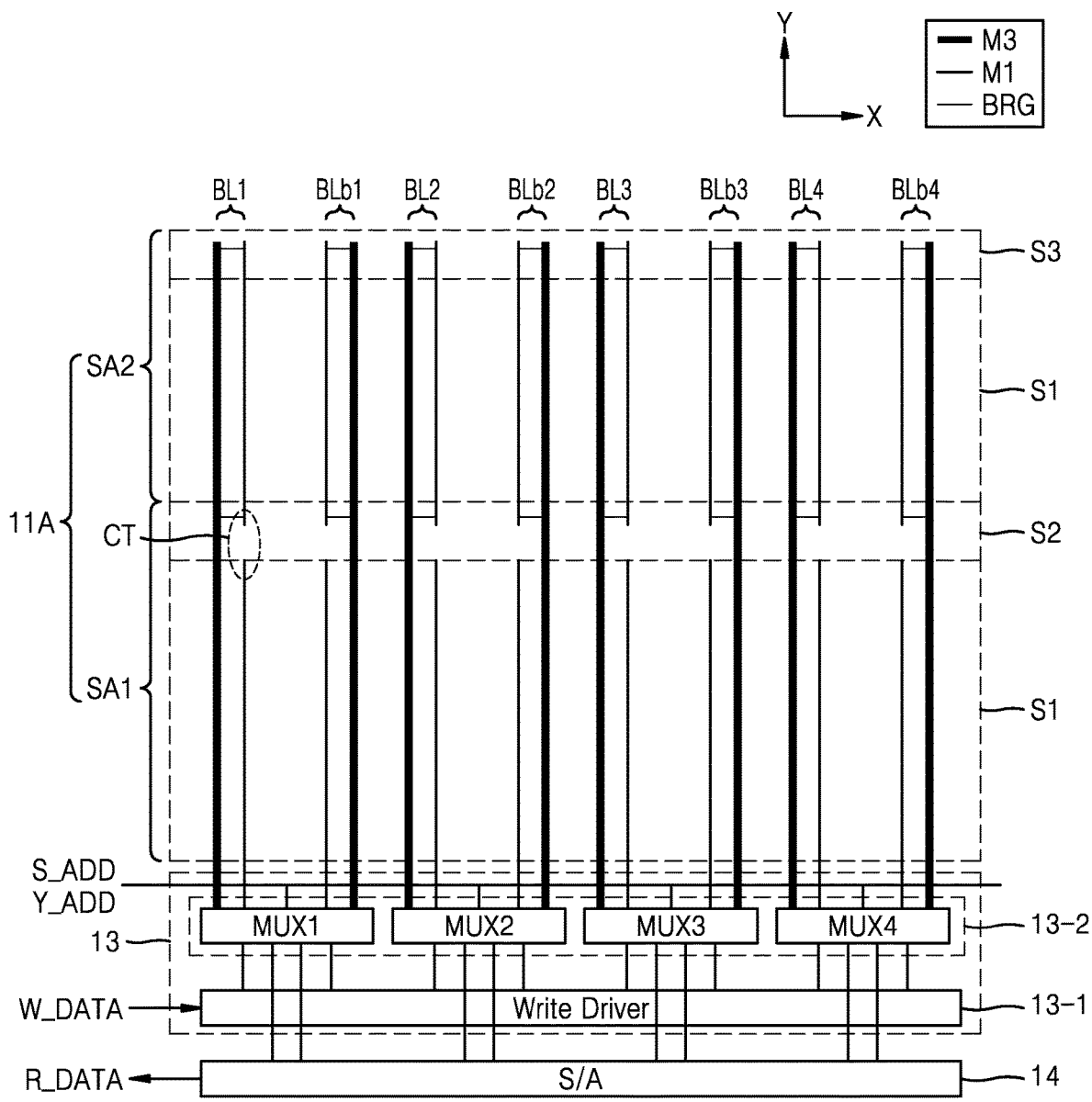
FIG. 3 is a diagram showing a partitioned dual bit line structure according to some embodiments.

FIG. 3 is a diagram showing a partitioned dual bit line structure according to some embodiments. FIG. 3 illustrates an arrangement of metal wirings constituting the bit lines BLs, and the word lines WLs constituting a memory cell array 11A and power lines for supplying a voltage to the memory cell array 11A may not be illustrated.

Referring to FIG. 3, the memory cell array 11A may include the first sub-array SA1 and the second sub-array SA2. The first sub-array SA1 and the second sub-array SA2 may be arranged adjacent to each other in the second direction Y. The first sub-array SA1 may include a portion of each of a plurality of bit lines BL1-BL4 and a plurality of complementary bit lines BLb1-BLb4 that are complementary to the bit lines BL1-BL4, which are spaced apart from each other along the first direction X and extend in the second direction Y, and the second sub-array SA2 may include another portion of each of the bit lines BL1-BL4 and the complementary bit lines BLb1-BLb4.

The bit lines BL1-BL4 and the complementary bit lines BLb1-BLb4 constituting the memory cell array 11A may be implemented by using a first metal wiring M1 and a third metal wiring M3. Although the first metal wiring M1 and the third metal wiring M3 may at least partially overlap each other in the third direction Z perpendicular to the first direction X and the second direction Y, in some drawings including FIG. 3, for convenience of explanation, the first metal wiring M1 and the third metal wiring M3 are illustrated to be parallel to each other.

The first sub-array SA1 may include a first structure S1 and a second structure S2. The first structure S1 may be arranged adjacent to the column driver 13, and the second structure S2 may be arranged in the boundary between the first sub-array SA1 and the second sub-array SA2. The first structure S1 and the second structure S2 may be adjacent to each other in the second direction Y. The bit lines BL1-BL4 and the complementary bit lines BLb1-BLb4 constituting the first structure S1 and the second structure S2 may be implemented by the first metal wiring M1 extending in the second direction Y and the third metal wiring M3 extending in the second direction Y and at least partially overlapping the first metal wiring M1 along the third direction Z.

The second structure S2 may be referred to as an "upper end of the first sub-array SA1." The second structure S2 may include a cutting portion CT and a bridge BRG. The cutting portion CT may correspond to a disconnection between portions of the first metal wiring M1, and for example, may correspond to a part of the first metal wiring M1 that has been cut. The cutting portion CT may cut off an electrical connection between the first sub-array SA1 and the second sub-array SA2 via the first metal wiring M1. The bridge BRG may be arranged in an upper end of the second structure S2. The bridge BRG included in the second structure S2 may be arranged closer to the second sub-array SA2 than the cutting portion CT. The bridge BRG included in second structure S2 may electrically connect the third metal wiring M3 to the first metal wiring M1 extending toward the second sub-array SA2.

The second structure S2 may not include the bit cells 12. Accordingly, the cutting portion CT and the bridge BRG included in the second structure S2 may be arranged apart from the bit cells 12 included in the first sub-array SA1.

The second sub-array SA2 may include the first structure S1 and a third structure S3. The first structure S1 may be arranged adjacent to the first sub-array SA1, and the first structure S1 and the third structure S3 may be adjacent to each other in the second direction Y. The bit lines BL1-BL4 and the complementary bit lines BLb1-BLb4 constituting the first structure S1 and the third structure S3 may be implemented by the first metal wiring M1 extending in the second direction Y and the third metal wiring M3 extending in the second direction Y and at least partially overlapping the first metal wiring M1 along the third direction Z.

The third structure S3 may be referred to as an "upper end of the second sub-array SA2." The third structure S3 may further include the bridge BRG. The bridge BRG included in the third structure S3 may electrically connect the third metal wiring M3 to the first metal wiring M1. The bridge BRG included in the third structure S3 may be arranged in the boundary of the bit cells 12 included in the second sub-array SA2.

The column driver 13 may include a write driver 13-1 and a multiplexer portion 13-2. The write driver 13-1 may include at least two inverters and receive the write data W_DATA. The write driver 13-1 may control the multiplexer portion 13-2 such that the write data W_DATA that is received is written to the memory cell array 11A.

The multiplexer portion 13-2 may include a plurality of multiplexers MUX1-MUX4. Although FIG. 3 illustrates four multiplexers, this is an example for explanation, and the disclosure is not limited thereto. The multiplexer portion 13-2 may be electrically connected to the bit lines BL1-BL4 and the complementary bit lines BLb1-BLb4. The multiplexer portion 13-2 may receive the column address Y_ADD and the sub-array address S_ADD from the control block 16 of FIG. 1. The multiplexer portion 13-2 may receive the column address Y_ADD and the sub-array address S_ADD and transmit signals to the memory cell array 11A. The column address Y_ADD may indicate any one of the multiplexers MUX1-MUX4, and the sub-array address S_ADD may indicate any one of the first sub-array SA1 and the second sub-array SA2. The multiplexer portion 13-2 may be electrically connected to the write driver 13-1 and the sense amplifier 14.

The sense amplifier 14 may amplify a difference of signals output from the multiplexer portion 13-2 and generate the read data R_DATA.

According to an embodiment, as the second structure S2 including the cutting portion CT is provided, the first sub-array SA1 and the second sub-array SA2 may be separately controlled. As the first metal wiring M1 of the first sub-array SA1 and the first metal wiring M1 of the second sub-array SA2 are electrically separated, the resistance of the bit lines BL1-BL4 and the complementary bit lines BLb1-BLb4 may be reduced. Furthermore, the capacitance of the IC 10 including the memory cell array 11A may be reduced, and the resistance of the second sub-array SA2 may be less than the resistance of the first sub-array SA1, the write operational characteristics of the IC 10 may be improved.

Figure 4:
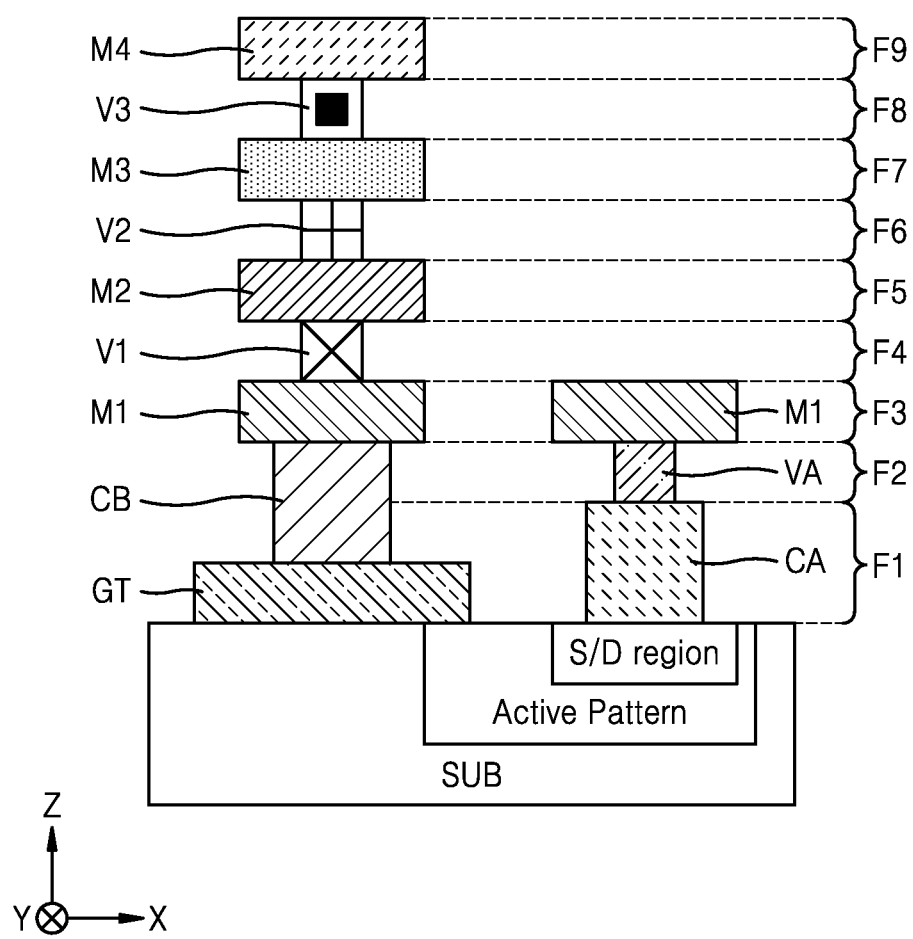
FIG. 4 is a schematic diagram of a stack structure of a metal wiring, according to an embodiment.

FIG. 4 is a schematic diagram of a stack structure of a metal wiring, according to an embodiment. For convenience of explanation, transistors included in each of the bit cells 12 of FIG. 1 are omitted, and the sizes of a gate electrode GT, an active contact CA, a gate contact CB, an active via VA, first to fourth metal wirings M1-M4, and first to third vias V1-V3 are arbitrarily illustrated. In this regard, FIG. 4 may be different from an actual cross-sectional view of each of the bit cells 12 of FIG. 1.

Referring to FIG. 4, the gate electrode GT, the gate contact CB, and the active contact CA may be formed in a first layer F1. The gate contact CB may connect the gate electrode GT to the first metal wiring M1. The active via VA connected to the active contact CA may be formed in a second layer F2. The second layer F2 may be referred to as a "contact via layer" or a "V0 layer." The sum of the heights of the gate electrode GT and the gate contact CB in the third direction Z may be the same as the sum of the heights of the active contact CA and the active via VA in the third direction Z.

The first metal wiring M1 may be formed in a third layer F3. The first metal wiring M1 may be formed on each of the gate contact CB and the active via VA. The first metal wiring M1 may correspond to the bit line BL of FIG. 2 or the complementary bit line BLb of FIG. 2. Furthermore, the first metal wiring M1 may correspond to a power line for supplying power to a transistor. The third layer F3 may be referred to as a "first wiring layer" or an "M1 layer."

A first via V1 may be formed in a fourth layer F4. The first via V1 may connect the first metal wiring M1 to a second metal wiring M2. The fourth layer F4 may be referred to as a "first via layer." The first via V1 may be formed above the gate electrode GT, but not above the active contact CA.

The second metal wiring M2 may be formed in a fifth layer F5. The second metal wiring M2 may correspond to the word line WL of FIG. 2. The fifth layer F5 may be referred to as a "second wiring layer" or an "M2 layer."

A second via V2 may be formed in a sixth layer F6. The second via V2 may connect the second metal wiring M2 to the third metal wiring M3. The sixth layer F6 may be referred to as a "second via layer."

The third metal wiring M3 may be formed in a seventh layer F7. The third metal wiring M3, with the first metal wiring M1, as described above with reference to FIG. 3, may constitute the bit line BL of FIG. 2 or the complementary bit line BLb of FIG. 2. Furthermore, the third metal wiring M3, with the first metal wiring M1, may correspond to the power line for supplying power to a transistor. For example, the power may be the power voltage VDD. The seventh layer F7 may be referred to as a "third wiring layer" or an "M3 layer."

A third via V3 may be formed in an eighth layer F8. The third via V3 may connect the third metal wiring M3 to a fourth metal wiring M4. The eighth layer F8 may be referred to as a "third via layer."

The fourth metal wiring M4 may be formed in a ninth layer F9. The fourth metal wiring M4, with the second metal wiring M2, as described below with reference to FIG. 35, may correspond to the word line WL of FIG. 2. The ninth layer F9 may be referred to as a "fourth wiring layer" or an "M4 layer."

The first layer F1 may be formed by a front end-of-line (FEOL) process, and the second layer to ninth layers F2-F9 may be formed by a back end-of-line (BEOL) process. A contact area may gradually decrease from the second layer F2 to the ninth layer F9.

Figure 5:
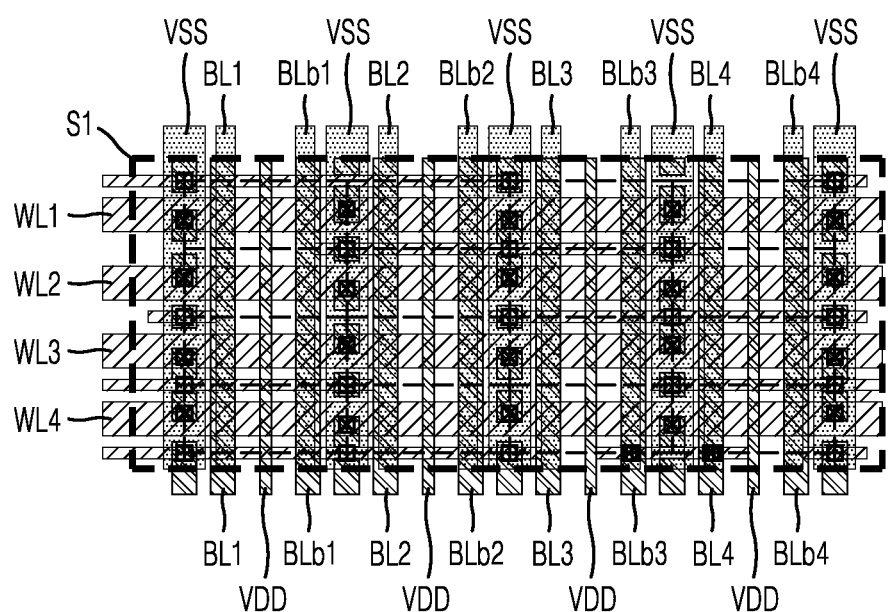
FIG. 5 is a layout diagram of a first structure of FIG. 4, according to some embodiments.
Figure 5:
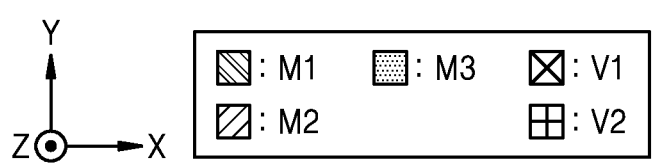
Figure 6:
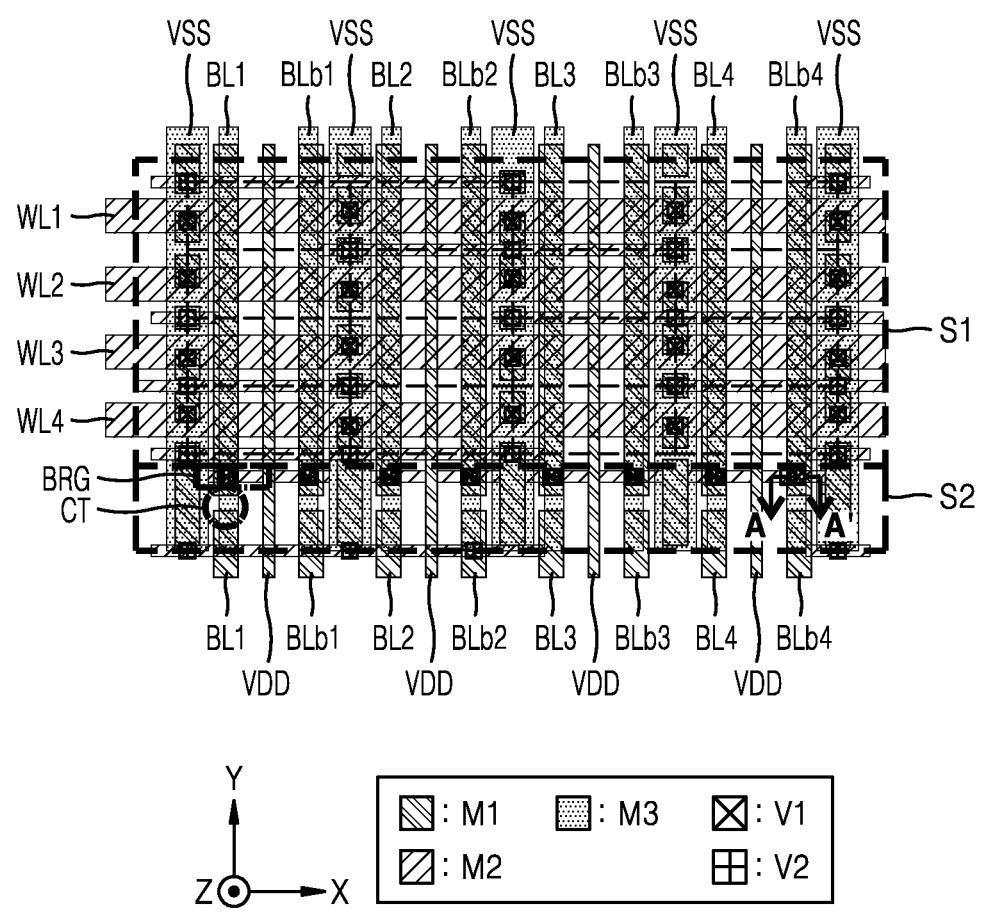
FIG. 6 is a layout diagram of a second structure of FIG. 4, according to some embodiments.
Figure 7:
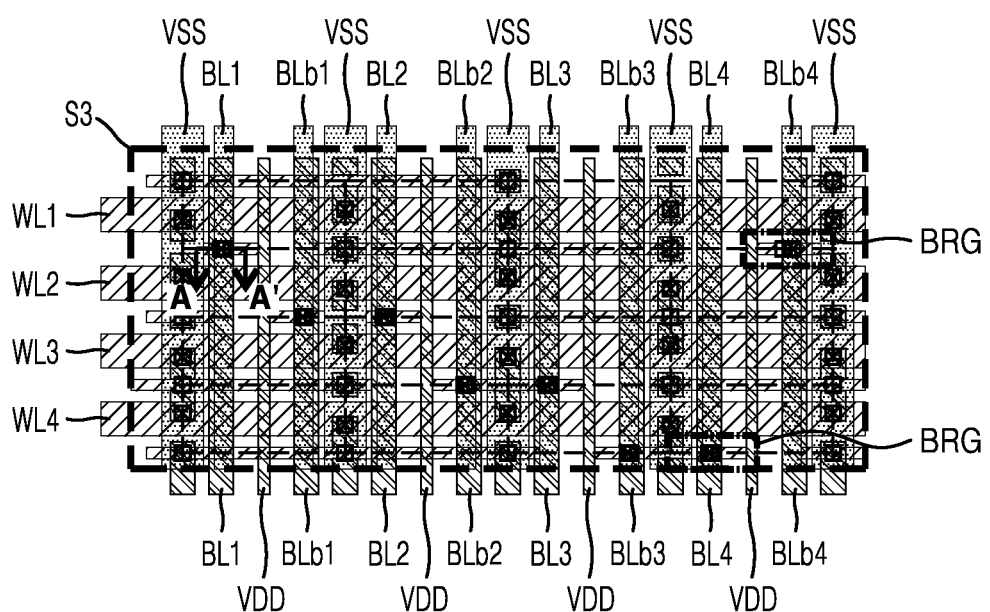
FIG. 7 is a layout diagram of a third structure of FIG. 4, according to some embodiments.
Figure 7:
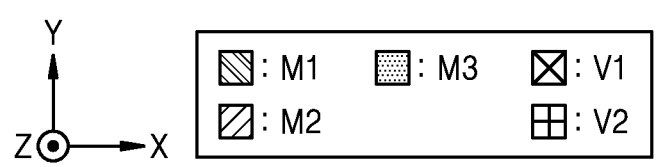

FIG. 5 is a layout diagram of the first structure S1 of FIG. 3, according to some embodiments. FIG. 6 is a layout diagram of the first structure S1 and the second structure S2 of FIG. 3, according to some embodiments. FIG. 7 is a layout diagram of the third structure S3 of FIG. 3, according to some embodiments. In the following description, descriptions are provided with reference to FIGS. 2 to 4, and like reference numerals denote like constituent elements and redundant descriptions thereof are omitted.

Referring to FIG. 5, the first to fourth bit lines BL1-BL4 and the first to fourth complementary bit lines BLb1-BLb4 may be implemented by using the first metal wiring M1 and the third metal wiring M3.

In the first structure S1, the first metal wirings M1 may be spaced apart from each other along the first direction X, and may extend in the second direction Y. In the first structure S1, the third metal wirings M3 may be spaced apart from each other along the first direction X, and may extend in the second direction Y. The first metal wiring M1 and the third metal wiring M3 may at least partially overlap each other in the third direction Z. In the first structure S1, the first metal wiring M1 and the third metal wiring M3 may not be electrically connected to each other.

In the first structure S1, the second metal wirings M2 may be spaced apart from each other along the second direction Y, and may extend in the first direction X. The second metal wiring M2 may partially overlap the first metal wiring M1 and the third metal wiring M3.

Referring to FIG. 6, the second structure S2 may not include the bit cells 12 of FIG. 1. The first structure S1 shown in FIG. 6 may be the first structure S1 included in the second sub-array SA2 of FIG. 3, and may have the same layout as that of the first structure S1 shown in FIG. 5.

The second structure S2 may include the cutting portion CT. The cutting portion CT may correspond to a disconnection between portions of the first metal wiring M1, and for example, may correspond to a part of the first metal wiring M1 corresponding to the first to fourth bit lines BL1-BL4 and the first to fourth complementary bit lines BLb1-BLb4 that has been cut. Accordingly, the electrical connection between the first sub-array SA1 and the second sub-array SA2 via the first metal wiring M1 may be cut off.

Furthermore, the second structure S2 may include the bridge BRG. The bridge BRG may electrically connect the first metal wiring M1 to the third metal wiring M3, to implement the first to fourth bit lines BL1-BL4 and the first to fourth complementary bit lines BLb1-BLb4. Accordingly, the bridge BRG may be formed on the first metal wiring M1 corresponding to the first to fourth bit lines BL1-BL4 and the first to fourth complementary bit lines BLb1-BLb4. The bridge BRG may have a structure as described below with reference to FIG. 8. The bridge BRG may include the first via V1, the second metal wiring M2, and the second via V2. The bridge BRG may be arranged adjacent to the first and second cutting portions CT1 and CT2 as described below with reference to FIG. 10 in the second direction Y.

Referring to FIG. 7, the third structure S3 may have a layout similar to that of the first structure S1. The third structure S3 may further include the bridge BRG. The bridge BRG included in the third structure S3 may be arranged in the boundary of the bit cells 12 of FIG. 1. Accordingly, an additional space for forming the bridge BRG may be unnecessary. As described above with reference to FIG. 6, the bridge BRG may electrically connect the first metal wiring M1 to the third metal wiring M3, to implement the first to fourth bit lines BL1-BL4 and the first to fourth complementary bit lines BLb1-BLb4. Accordingly, the bridge BRG may be formed on the first metal wiring M1 corresponding to the first to fourth bit lines BL1-BL4 and the first to fourth complementary bit lines BLb1-BLb4.

Figure 8:
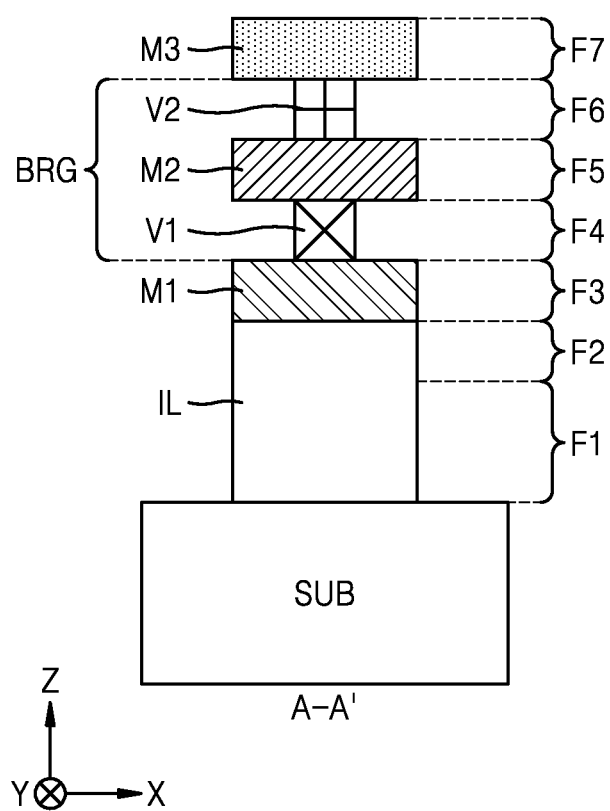
FIG. 8 is a diagram showing a stack structure of a bridge, according to some embodiments.

FIG. 8 is a diagram showing a stack structure of the bridge BRG, according to some embodiments. In detail, FIG. 8 is a schematic view showing a stack structure of the bridge BRG shown in FIGS. 6 and 7, and is a cross-sectional view taken along line A-A' of FIGS. 6 and 7. In the following description, descriptions are provided with reference to FIGS. 3, 6, and 7. FIG. 8 illustrates that an insulating layer IL is formed in the first layer F1 and the second layer F2, but the disclosure is not limited thereto.

Referring to FIG. 8, the bridge BRG may include the first via V1, the second metal wiring M2, and the second via V2. The second metal wiring M2 may extend in the first direction X farther than the first via V1 and the second via V2. The second metal wiring M2 included in the bridge BRG may be referred to as a "landing pad." According to the disclosure, as the bridge BRG is formed at both ends of the first metal wiring M1 included the second sub-array SA2 of the memory cell array 11a of FIG. 3, the capacitance of the landing pad M2 may be reduced.

Figure 9:
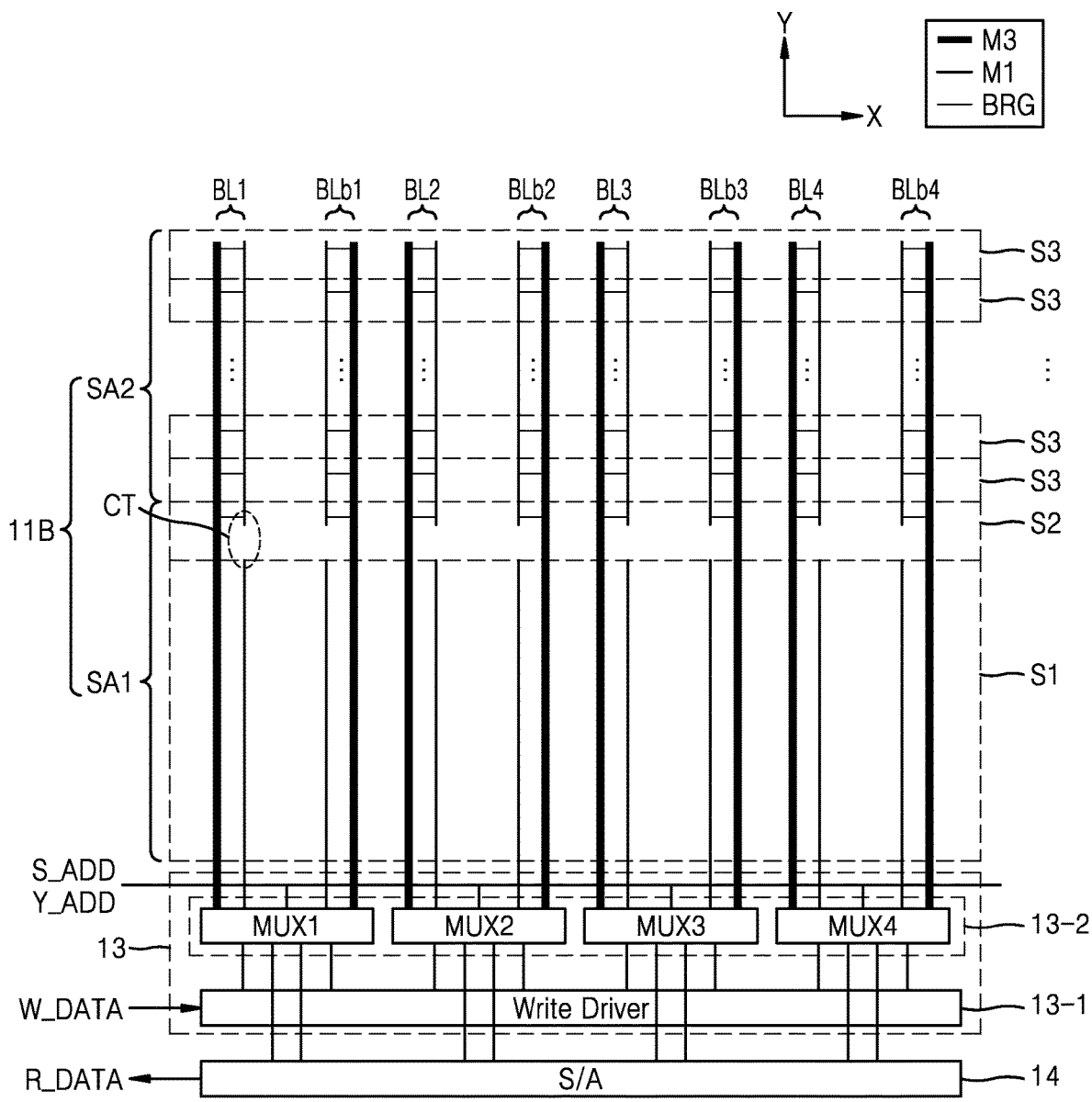
FIG. 9 is a diagram showing a partitioned dual bit line structure according to some embodiments.

FIG. 9 is a diagram showing a partitioned dual bit line structure according to some embodiments. In detail, FIG. 9 shows another embodiment of FIG. 3. FIG. 9 shows the arrangement of metal wirings constituting bit lines, and thus, word lines and power lines may be omitted in FIG. 9. The description with reference to FIG. 9 focuses on the differences from FIG. 3, and redundant descriptions thereof are omitted.

Referring to FIG. 9, the second sub-array SA2 of a memory cell array 11B may include the third structure S3 that is repeated. The third structure S3 may include a layout described above with reference to FIG. 7. As the second sub-array SA2 includes the third structure S3 that is repeated, the second sub-array SA2 may include a plurality of bridges BRGs that electrically connect the first metal wiring M1 to the third metal wiring M3 constituting the bit lines BL1-BL4 and the complementary bit lines BLb1-BLb4, and are repeatedly arranged in the second direction Y. The bridges BRGs may be formed in the boundary of the bit cells 12 of FIG. 1.

In an embodiment, as the memory cell array 11B includes the third structure S3 that is repeatedly arranged in the second direction Y, the bridges BRGs may be repeatedly formed in the second sub-array SA2, and accordingly, the resistance of the second sub-array SA2 may be reduced.

Figure 10:
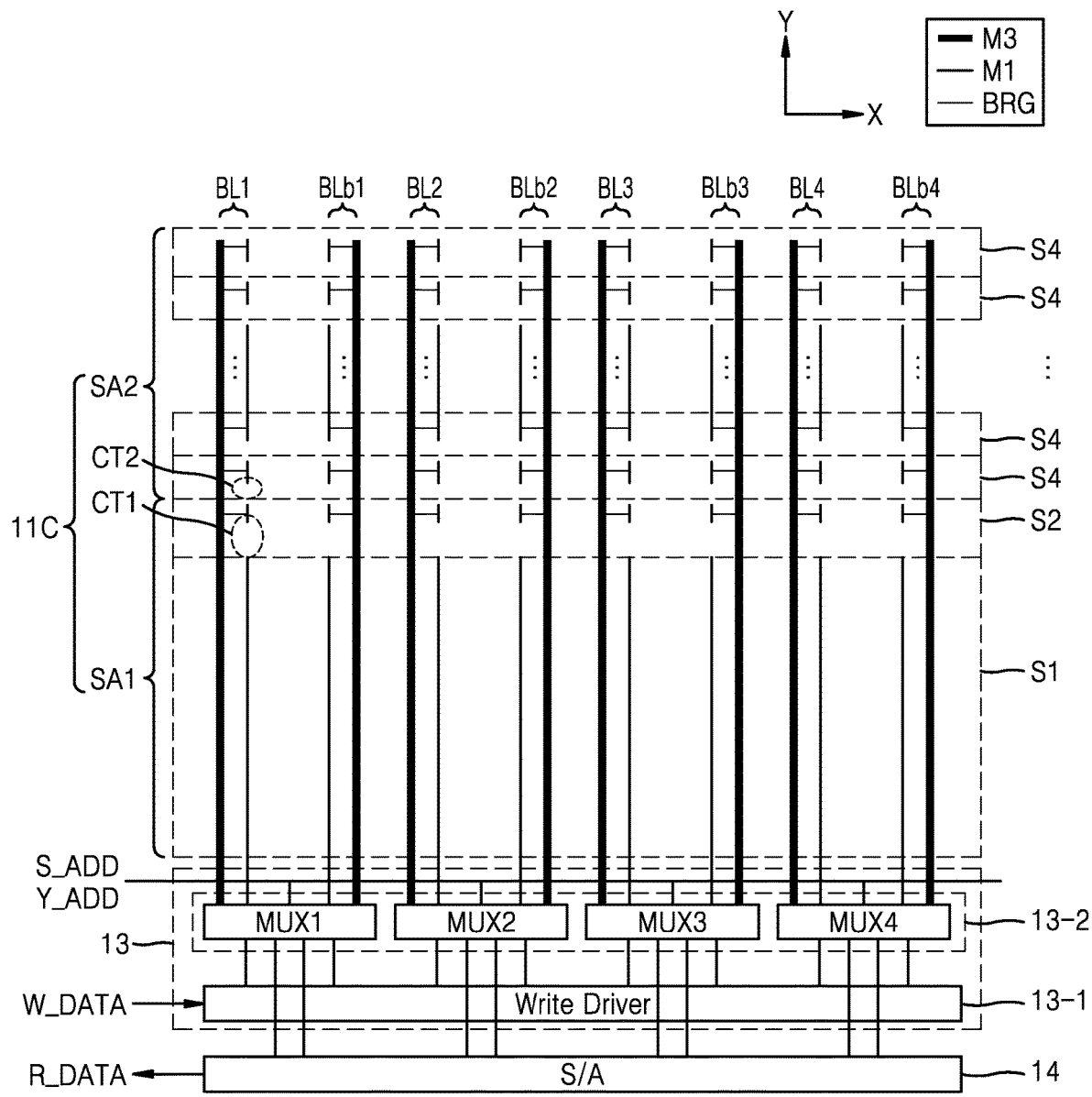
FIG. 10 is a diagram showing a partitioned dual bit line structure according to some embodiments.
Figure 11:
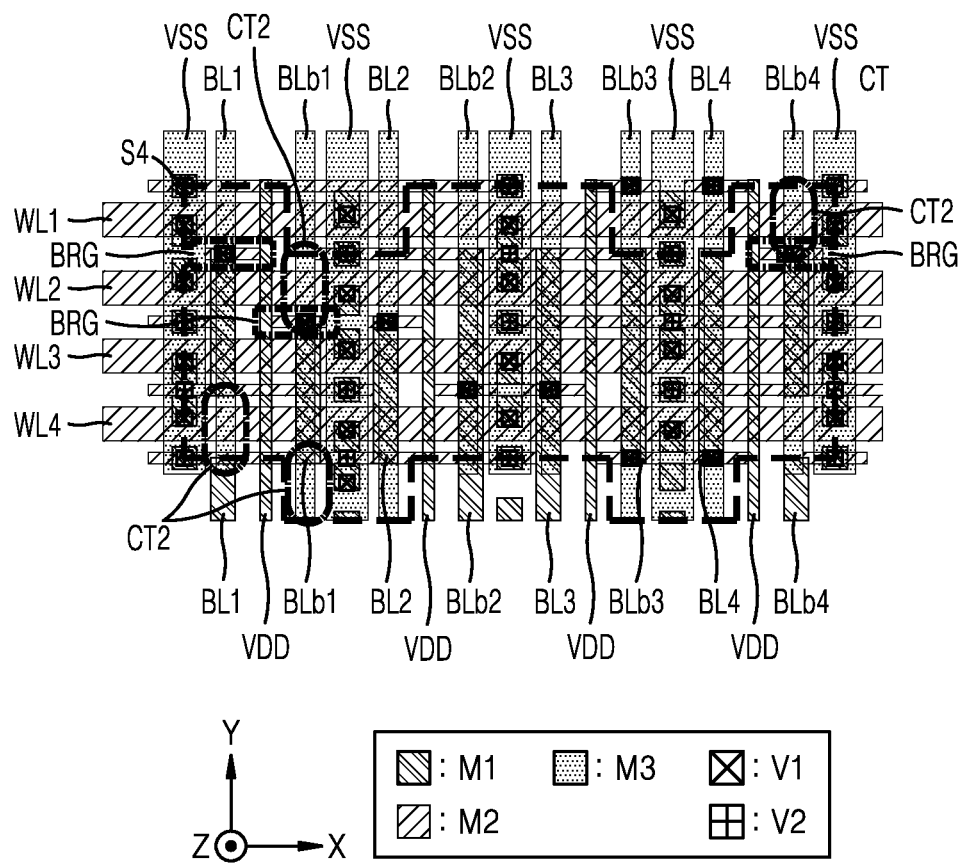
FIG. 11 is a layout diagram of a fourth structure of FIG. 10, according to some embodiments.

FIG. 10 is a diagram showing a partitioned dual bit line structure according to some embodiments. FIG. 11 is a layout diagram of a fourth structure S4 of FIG. 10, according to some embodiments. In detail, FIG. 10 shows another embodiment of FIG. 3. FIG. 10 shows the arrangement of metal wirings constituting bit lines, and thus, word lines and power lines may be omitted in FIG. 10. The description with reference to FIG. 10 focuses on the differences from FIG. 3, and redundant descriptions thereof are omitted.

Referring to FIG. 10, the second sub-array SA2 of a memory cell array 11C may include the fourth structure S4 that is repeated. The fourth structure S4 may include a layout described below with reference to FIG. 11. Accordingly, the bridge BRG may be formed in the boundary of the bit cells 12 of FIG. 1. As the fourth structure S4 is repeated in the second direction Y, the bridge BRG may be repeatedly formed in the second sub-array SA2, and accordingly, the resistance of the second sub-array SA2 may be reduced.

Furthermore, the second structure S2 of the memory cell array 11C may include a first cutting portion CT1, and the fourth structure S4 may include a second cutting portion CT2. The first cutting portion CT1 may have the same configuration as the cutting portion CT described above with reference to FIG. 3.

The second cutting portion CT2 may correspond to a disconnection between portions of the first metal wiring M1, and for example, may correspond to a part of the first metal wiring M1 in the fourth structure S4 that has been cut. Accordingly, the second cutting portion CT2 may partially cut off the electrical connection of the first metal wiring M1 in the second sub-array SA2. As the second sub-array SA2 includes the fourth structure S4 that is repeated, the second cutting portion CT2 may be repeatedly arranged at regular intervals in the second direction Y, and the first metal wiring M1 constituting the bit lines BL1-BL4 and the complementary bit lines BLb1-BLb4 may be repeatedly cut at regular intervals in the second direction Y. Accordingly, the capacitance of the second sub-array SA2 may be reduced.

Referring to FIG. 11, the fourth structure S4 may have a layout similar to the third structure S3. Accordingly, the fourth structure S4 may include the bridge BRG arranged in the boundary of the bit cells 12 of FIG. 1. Accordingly, an additional space for forming the bridge BRG may be unnecessary.

The fourth structure S4, unlike the third structure S3, may further include the second cutting portion CT2. The second cutting portion CT2 may correspond to a disconnection between portions of the first metal wiring M1, and for example, may correspond to a part of the first metal wiring M1 constituting the bit lines BL1-BL4 and the complementary bit lines BLb1-BLb4 that has been cut. Accordingly, the electrical connection between the fourth structures S4 via the first metal wiring M1 arranged to neighbor each other in the second direction Y may be cut off. In this case, the second cutting portion CT2 may not be formed on the first metal wiring M1 corresponding to power lines.

Figure 12:
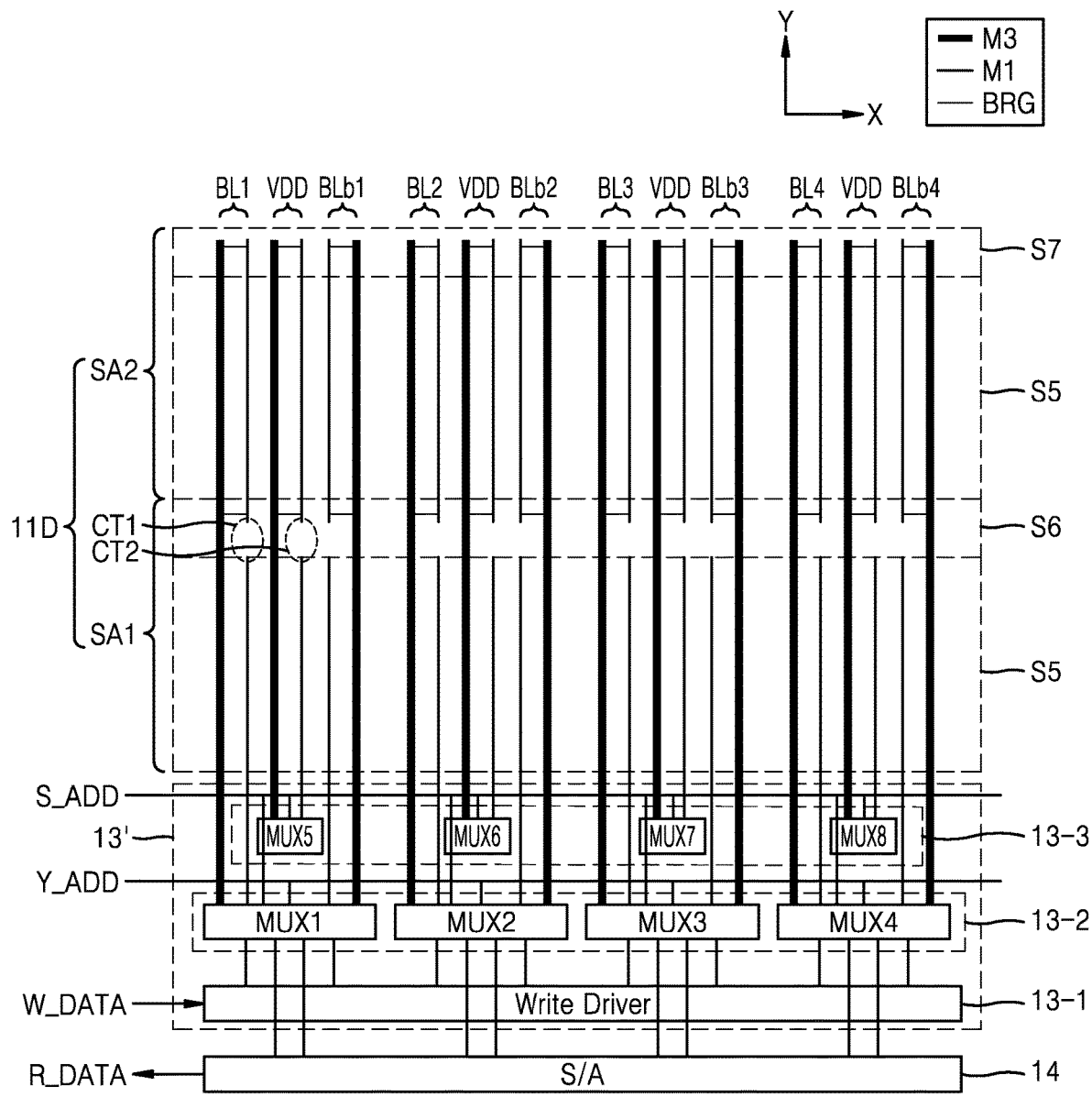
FIG. 12 is a diagram showing a partitioned dual bit line structure and a partitioned dual power line structure, according to some embodiments.

FIG. 12 is a diagram showing a partitioned dual bit line structure and a partitioned dual power line structure, according to some embodiments. FIG. 12 shows the arrangement of metal wirings constituting the bit lines BLs and power lines for supplying a voltage to a memory cell array 11D, and thus, the word lines WLs of FIG. 1 constituting the memory cell array 11A may not be illustrated.

Referring to FIG. 12, the bit lines BL1-BL4, the complementary bit lines BLb1-BLb4, and the power lines constituting the memory cell array 11D may be implemented by using the first metal wiring M1 and the third metal wiring M3. The power lines may include constituent elements, such as the bit lines BL1-BL4 and the complementary bit lines BLb1-BLb4. The first metal wiring M1 and the third metal wiring M3 may at least partially overlap each other in the third direction Z perpendicular to the first direction X and the second direction Y, but for convenience of explanation, the first metal wiring M1 and the third metal wiring M3 may be illustrated as being parallel to each other.

The memory cell array 11D may include the first sub-array SA1 and the second sub-array SA2. The first sub-array SA1 and the second sub-array SA2 may be arranged adjacent to each other in the second direction Y. The first sub-array SA1 may include a fifth structure S5 and a sixth structure S6. The fifth structure S5 may be arranged adjacent to a column driver 13', and the sixth structure S6 may be arranged in the boundary between the first sub-array SA1 and the second sub-array SA2. The fifth structure S5 and the sixth structure S6 may be adjacent to each other in the second direction Y. The bit lines BL1-BL4, the complementary bit lines BLb1-BLb4, and the power lines constituting the fifth structure S5 and the sixth structure S6 may be implemented by the first metal wiring M1 extending in the second direction Y and the third metal wiring M3 extending in the second direction Y and at least partially overlapping the first metal wiring M1 along the third direction Z.

The sixth structure S6 may further include the first cutting portion CT1 and the second cutting portion CT2. The first and second cutting portions CT1 and CT2 may correspond to disconnections between portions of the first metal wirings M1, and for example, may correspond to parts of the first metal wirings M1 that have been cut. The first cutting portion CT1 may correspond to a disconnection between portions of the first metal wiring M1 corresponding to the bit lines BL1-BL4 and the complementary bit lines BLb1-BLb4, and the second cutting portion CT2 may correspond to a disconnection between portions of the first metal wiring M1 corresponding to the power lines. The first and second cutting portions CT1 and CT2 may cut off the electrical connection between the first sub-array SA1 and the second sub-array SA2 via the first metal wiring M1.

The sixth structure S6 may further include the bridge BRG. The bridge BRG may be arranged in an upper end of the sixth structure S6. The bridge BRG included in the sixth structure S6 may electrically connect the third metal wiring M3 to the first metal wiring M1 extending in the second sub-array SA2.

The second sub-array SA2 may include the fifth structure S5 and a seventh structure S7. The fifth structure S5 may be arranged adjacent to the first sub-array SA1, and the fifth structure S5 and the seventh structure S7 may be adjacent to each other in the second direction Y. The bit lines BL1-BL4, the complementary bit lines BLb1-BLb4, and the power lines constituting the fifth structure S5 and the seventh structure S7 may be implemented by the first metal wiring M1 extending in the second direction Y and the third metal wiring M3 extending in the second direction Y and at least partially overlapping the first metal wiring M1 along the third direction Z.

The seventh structure S7 may further include the bridge BRG. The bridge BRG may be arranged in the upper end of the seventh structure S7. The bridge BRG included in the seventh structure S7 may electrically connect the third metal wiring M3 to the first metal wiring M1.

The column driver 13' may include the write driver 13-1, a first multiplexer portion 13-2, and a second multiplexer portion 13-3. The write driver 13-1 may include at least two inverters, and receive the write data W_DATA. The write driver 13-1 may control the first multiplexer portion 13-2 and the second multiplexer portion 13-3 such that the write data W_DATA is written to the memory cell array 11D.

The first multiplexer portion 13-2 may include the multiplexers MUX1-MUX4. Although FIG. 12 illustrates that the first multiplexer portion 13-2 includes four multiplexers, this is an example for explanation, and the disclosure is not limited thereto. The first multiplexer portion 13-2 may be electrically connected to the bit lines BL1-BL4 and the complementary bit lines BLb1-BLb4. The first multiplexer portion 13-2 may receive the column address Y_ADD and the sub-array address S_ADD from the control block 16 of FIG. 1. The column address Y_ADD may indicate any one of the multiplexers MUX1-MUX4, and the sub-array address S_ADD may indicate any one of the first sub-array SA1 and the second sub-array SA2. The first multiplexer portion 13-2 may be electrically connected to the write driver 13-1 and the sense amplifier 14.

The second multiplexer portion 13-3 may include a plurality of multiplexers MUX5-MUX8. Although FIG. 12 illustrates that the second multiplexer portion 13-3 includes four multiplexers, this is an example for explanation, and the disclosure is not limited thereto. The second multiplexer portion 13-3 may be electrically connected to the power lines. The second multiplexer portion 13-3 may receive the column address Y_ADD and the sub-array address S_ADD from the control block 16 of FIG. 1. The column address Y_ADD may indicate any one of the multiplexers MUX5-MUX8, and the sub-array address S_ADD may indicate any one of the first sub-array SA1 and the second sub-array SA2. The second multiplexer portion 13-3 may be electrically connected to the write driver 13-1.

The sense amplifier 14 may generate the read data R_DATA by amplifying a difference of signals output from the first multiplexer portion 13-2.

According to an embodiment, as provided is the sixth structure S6 including the first cutting portion CT1 and the second cutting portion CT2, the first sub-array SA1 and the second sub-array SA2 may each be controlled. Accordingly, the resistance of the bit lines BL1-BL4, the complementary bit lines BLb1-BLb4, and the power lines included in the memory cell array 11D may be reduced, and the capacitance of the memory cell array 11D may be reduced.

Figure 13:
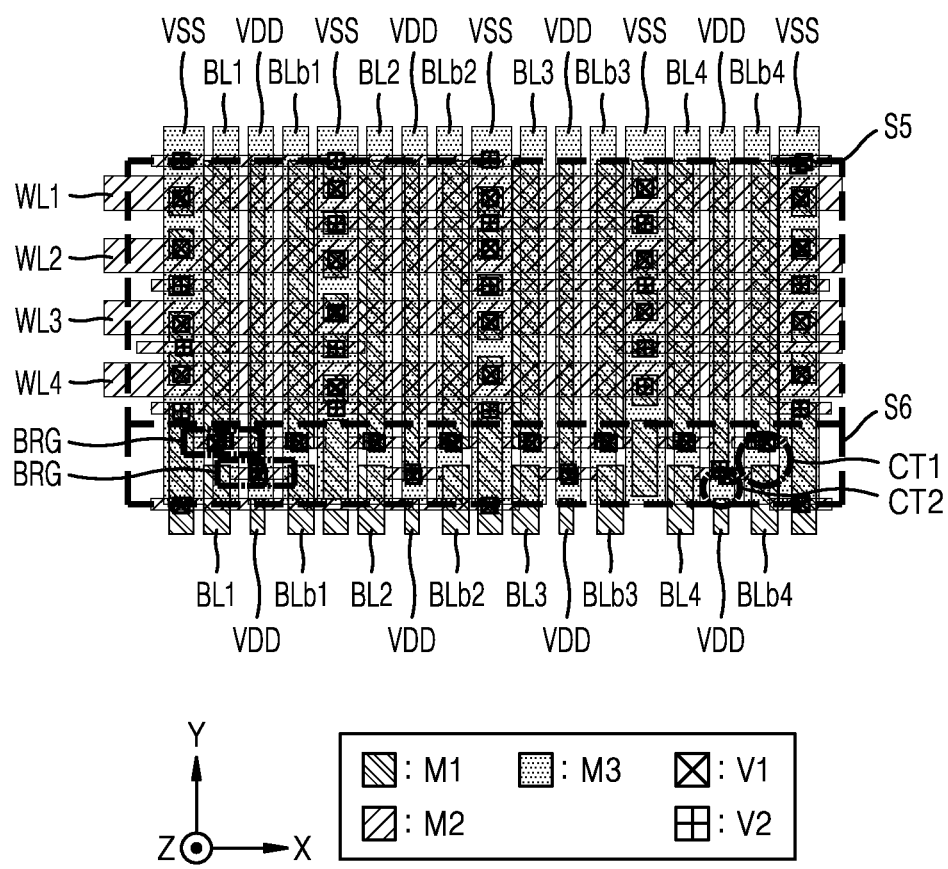
FIG. 13 is a layout diagram of a fifth structure and a sixth structure of FIG. 12, according to some embodiments.
Figure 14:
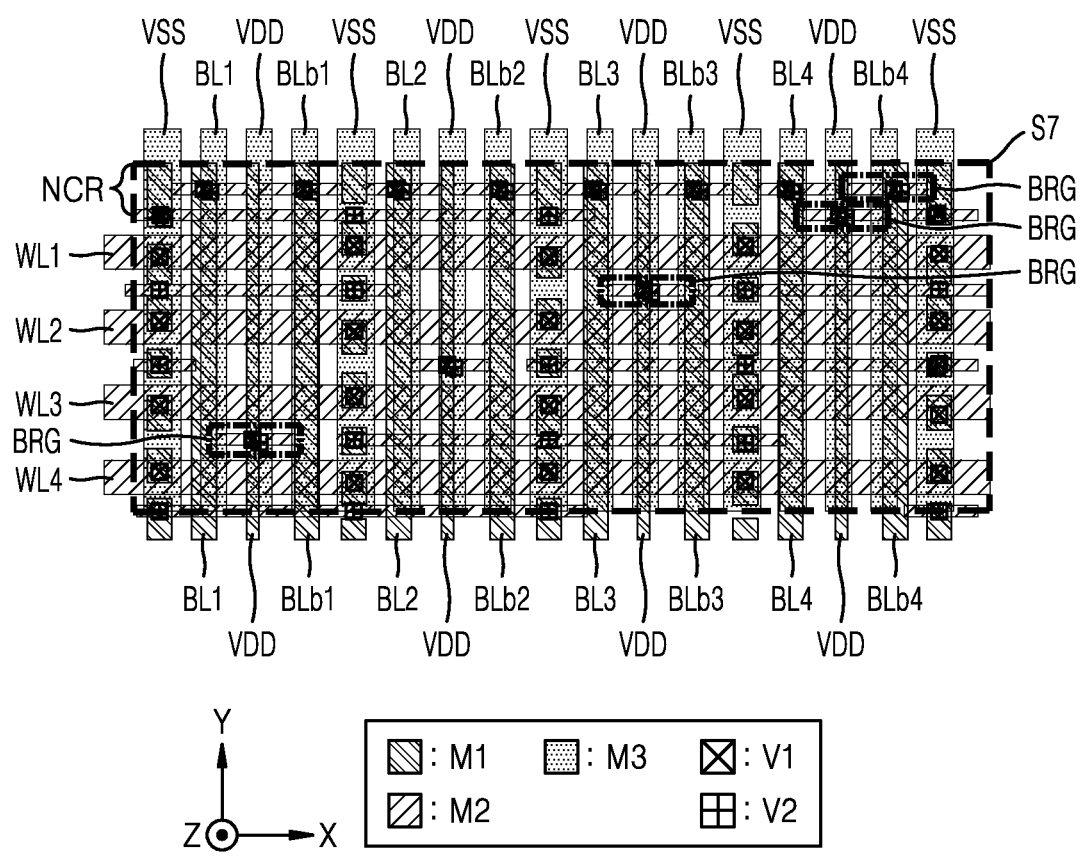
FIG. 14 is a layout diagram of a seventh structure of FIG. 12, according to some embodiments.

FIG. 13 is a layout diagram of the fifth structure S5 and the sixth structure S6 of FIG. 12, according to some embodiments. FIG. 14 is a layout diagram of the seventh structure S7 of FIG. 12, according to some embodiments. In detail, FIG. 13 is a layout diagram of the fifth structure S5 of the second sub-array SA2 and the sixth structure S6 of the first sub-array SA1 of FIG. 12, and FIG. 14 is a layout diagram of the seventh structure S7 of the second sub-array SA2 of FIG. 12. In the following description, descriptions are provided with reference to FIG. 12, and like reference numerals denote like constituent elements and redundant descriptions thereof are omitted.

Referring to FIG. 13, the first to fourth bit lines BL1-BL4, the first to fourth complementary bit lines BLb1-BLb4, and the power lines may be implemented by using the first metal wiring M1 and the third metal wiring M3.

In the fifth structure S5, the first metal wiring M1 and the third metal wiring M3 may be spaced apart from each other along the first direction X, and may extend in the second direction Y. The first metal wiring M1 and the third metal wiring M3 may at least partially overlap each other in the third direction Z. In the first structure S1, the first metal wiring M1 and the third metal wiring M3 may not be electrically connected to each other. The fifth structure S5 included in the first sub-array SA1 may be the same as the fifth structure S5 included in the second sub-array SA2.

The sixth structure S6 may not include the bit cells 12 of FIG. 1. The sixth structure S6 may include the first cutting portion CT1 and the second cutting portion CT2. The first cutting portion CT1 may correspond to a disconnection between portions of the first metal wiring M1, and for example, may correspond to a part of the first metal wiring M1 corresponding to the first to fourth bit lines BL1-BL4 and the first to fourth complementary bit lines BLb1-BLb4 that has been cut. The second cutting portion CT2 may correspond to a disconnection between portions of the first metal wiring M1, and for example, may correspond to a part of the first metal wiring M1 corresponding to the power lines that has been cut. Accordingly, the electrical connection between the first sub-array SA1 and the second sub-array SA2 via the first metal wiring M1 may be cut off.

Furthermore, the sixth structure S6 may include the bridge BRG. The bridge BRG may electrically connect the first metal wiring M1 to the third metal wiring M3, to implement the first to fourth bit lines BL1-BL4, the first to fourth complementary bit lines BLb1-BLb4, and the power lines. Accordingly, the bridge BRG may be formed on the first metal wiring M1 corresponding to the first to fourth bit lines BL1-BL4, the first to fourth complementary bit lines BLb1-BLb4, and the power lines. The bridge BRG may have a structure similar to that described above with reference to FIG. 8. The bridge BRG may include the first via V1, the second metal wiring M2, and the second via V2. The bridge BRG may be arranged adjacent to the first and second cutting portions CT1 and CT2 in the second direction Y.

Referring to FIG. 14, the seventh structure S7 may have a layout similar to the fifth structure S5, and may further include a non-cell region NCR and the bridge BRG. The non-cell region NCR may be a dummy area formed in the memory cell array 11D of FIG. 12 in an IC manufacturing process. A part of the bridge BRG included in the seventh structure S7 may be arranged in the boundary of the bit cells 12 of FIG. 1, and the other part may be arranged in the non-cell region NCR. For example, the bridge BRG formed on the first metal wiring M1 corresponding to the power lines may be arranged in the boundary of the bit cells 12 of FIG. 1, and the bridge BRG formed on the first metal wiring M1 corresponding to the first to fourth bit lines BL1-BL4 and the first to fourth complementary bit lines BLb1-BLb4 may be arranged in the non-cell region NCR.

Figure 15:
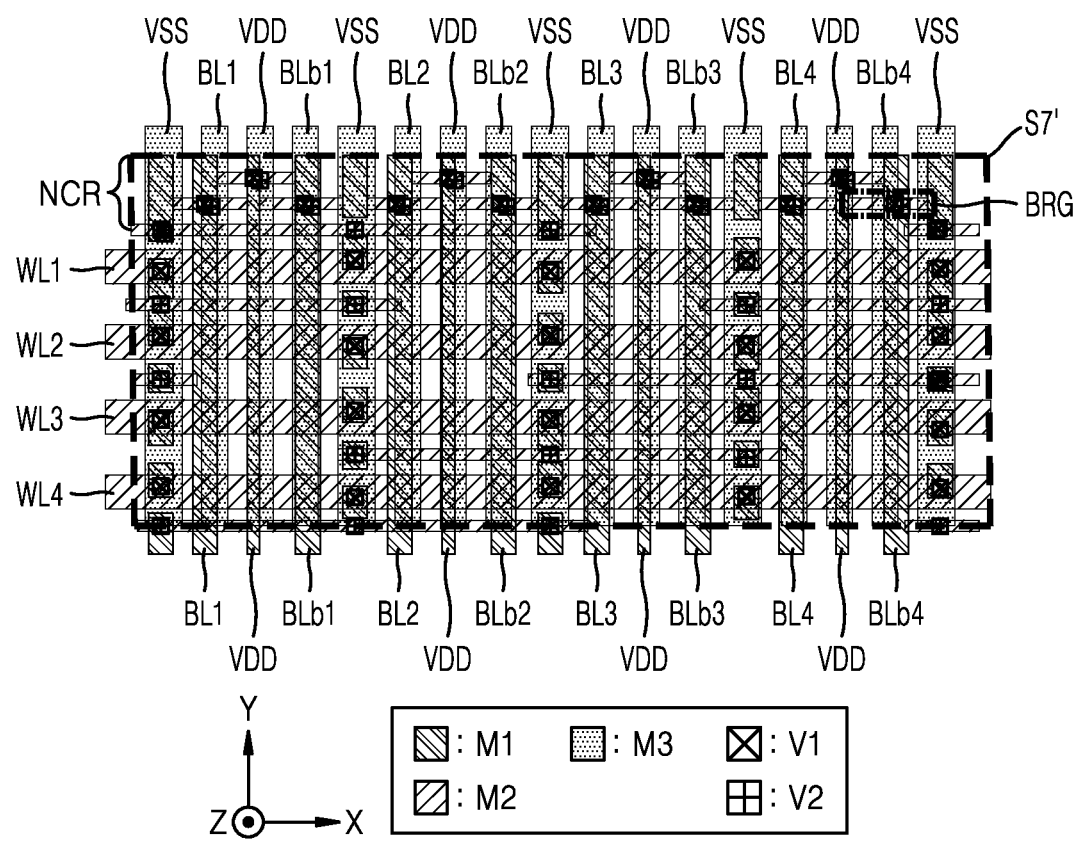
FIG. 15 is a layout diagram of a seventh structure of FIG. 12, according to some embodiments.
Figure 16:
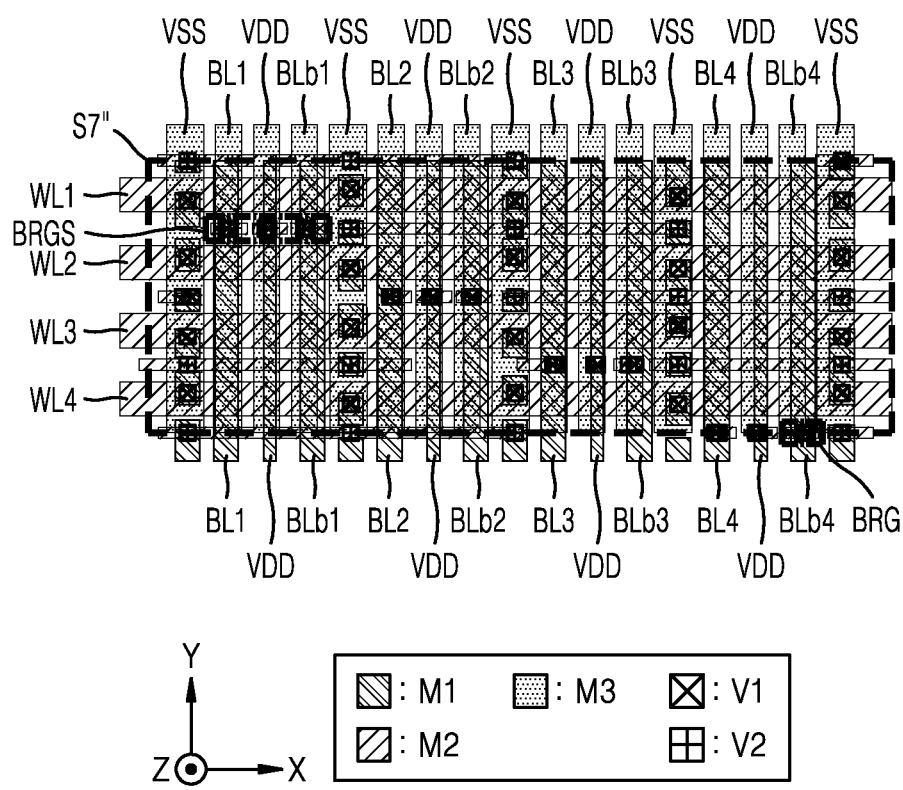
FIG. 16 is a layout diagram of a seventh structure of FIG. 12, according to some embodiments.

FIGS. 15 and 16 are layout diagrams of seventh structures S7' and S7" according to some embodiments. In detail, FIGS. 15 and 16 illustrate embodiments different from the embodiment in FIG. 14. In the following description, the differences from FIG. 14 are mainly described.

Referring to FIG. 15, the seventh structure S7' may further include the non-cell region NCR and the bridge BRG. The bridges BRGs included in the seventh structure S7' may all be arranged in the non-cell region NCR. For example, the bridge BRG formed on the first metal wiring M1 corresponding to the power lines may be formed adjacent to the bridge BRG formed on the first metal wiring M1 corresponding to the first to fourth bit lines BL1-BL4 and the first to fourth complementary bit lines BLb1-BLb4, in the non-cell region NCR, in the second direction Y. The size of the non-cell region NCR of FIG. 15 may be greater than the size of the non-cell region NCR of FIG. 14.

Referring to FIG. 16, the seventh structure S7" may not include the non-cell region NCR. The seventh structure S7" may further include the bridge BRG, compared with the fifth structure S5 of FIG. 13. The bridges BRGs included in the seventh structure S7" may all be arranged in the boundary of the bit cells 12 of FIG. 1. For example, the bridges BRGs formed on the first metal wiring M1 respectively corresponding to the first bit line BL1, the first complementary bit line BLb1, and the power lines may be spaced apart from each other along the first direction X, and the positions thereof in the second direction Y may be the same.

The bridges BRGs formed on the first metal wiring M1 corresponding to the first bit line BL1, the first complementary bit line BLb1, and the power lines between the first bit line BL1 and the first complementary bit line BLb1 may be referred to as a "first bridge set BRGS," and may be arranged between a first word line WL1 and a second word line WL2. Furthermore, the bridge BRG formed on the first metal wiring M1 corresponding to the second bit line BL2, the second complementary bit line BLb2, and the power lines between the second bit line BL2 and the second complementary bit line BLb2 may be referred to as a "second bridge set," and may be arranged between the second word line WL2 and a third word line WL3. In this regard, the first bridge set BRGS and the second bridge set may be arranged on different axes in the first direction X.

As the bridges BRGs included in the seventh structure S7" are all arranged IN the boundary of the bit cells 12 of FIG. 1, the seventh structure S7" may not require an additional space, for example, a non-cell region, to arrange the bridges BRGs. Accordingly, the additional space may be omitted and the size of a memory cell including the seventh structure S7" may be reduced.

Figure 17:
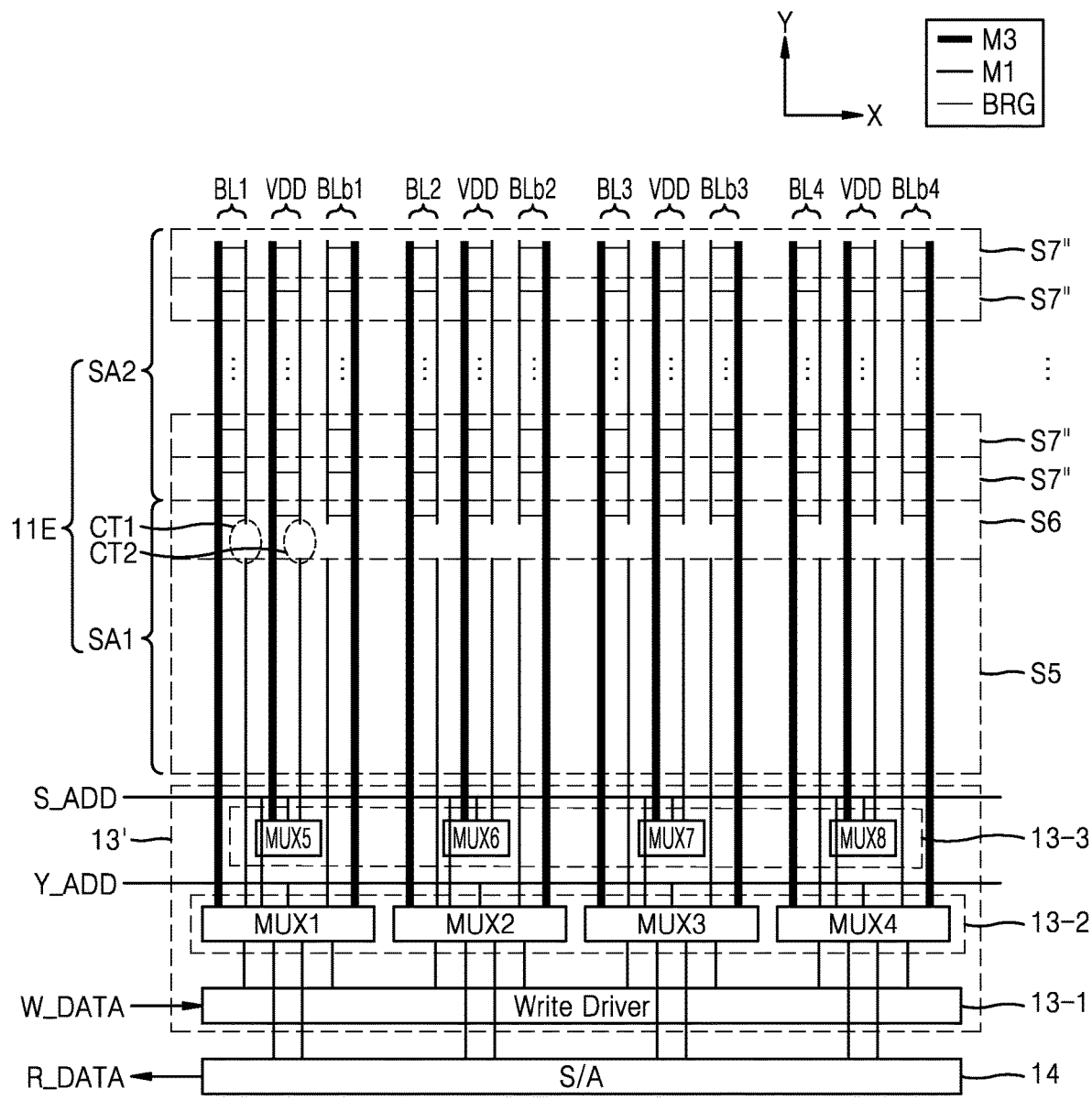
FIG. 17 is a diagram showing a partitioned dual bit line structure and partitioned dual power line structure, according to some embodiments.

FIG. 17 is a diagram showing a partitioned dual bit line structure and partitioned dual power line structure, according to some embodiments. In detail, FIG. 17 shows another embodiment of FIG. 12. FIG. 17 shows the arrangement of metal wirings constituting power lines for supplying a voltage to the bit lines BLs and a memory cell array 11E, and thus, the word lines WLs of FIG. 1 constituting the memory cell array 11E may not be illustrated. The description with reference to FIG. 17 focuses on the differences from FIG. 12, and redundant descriptions thereof are omitted.

Referring to FIG. 17, the second sub-array SA2 of the memory cell array 11E may include the seventh structure S7" that is repeated. The seventh structure S7" may include a layout described above with reference to FIG. 16. Accordingly, the bridges BRGs may all be arranged in the boundary of the bit cells 12 of FIG. 1. As the memory cell array 11E includes the seventh structure S7" that is repeated, the size of the memory cell array 11E may be reduced, and the resistance of the second sub-array SA2 may be reduced.

Although the seventh structure included in the second sub-array SA2 of FIG. 17 is illustrated as the seventh structure S7" described above with reference to FIG. 16, the disclosure is not limited thereto, and the seventh structure that is repeatedly arranged in the second sub-array SA2 of the memory cell array 11E may be the seventh structure S7 described above with reference to FIG. 14, and the seventh structure S7' described above with reference to FIG. 15.

Figure 18:
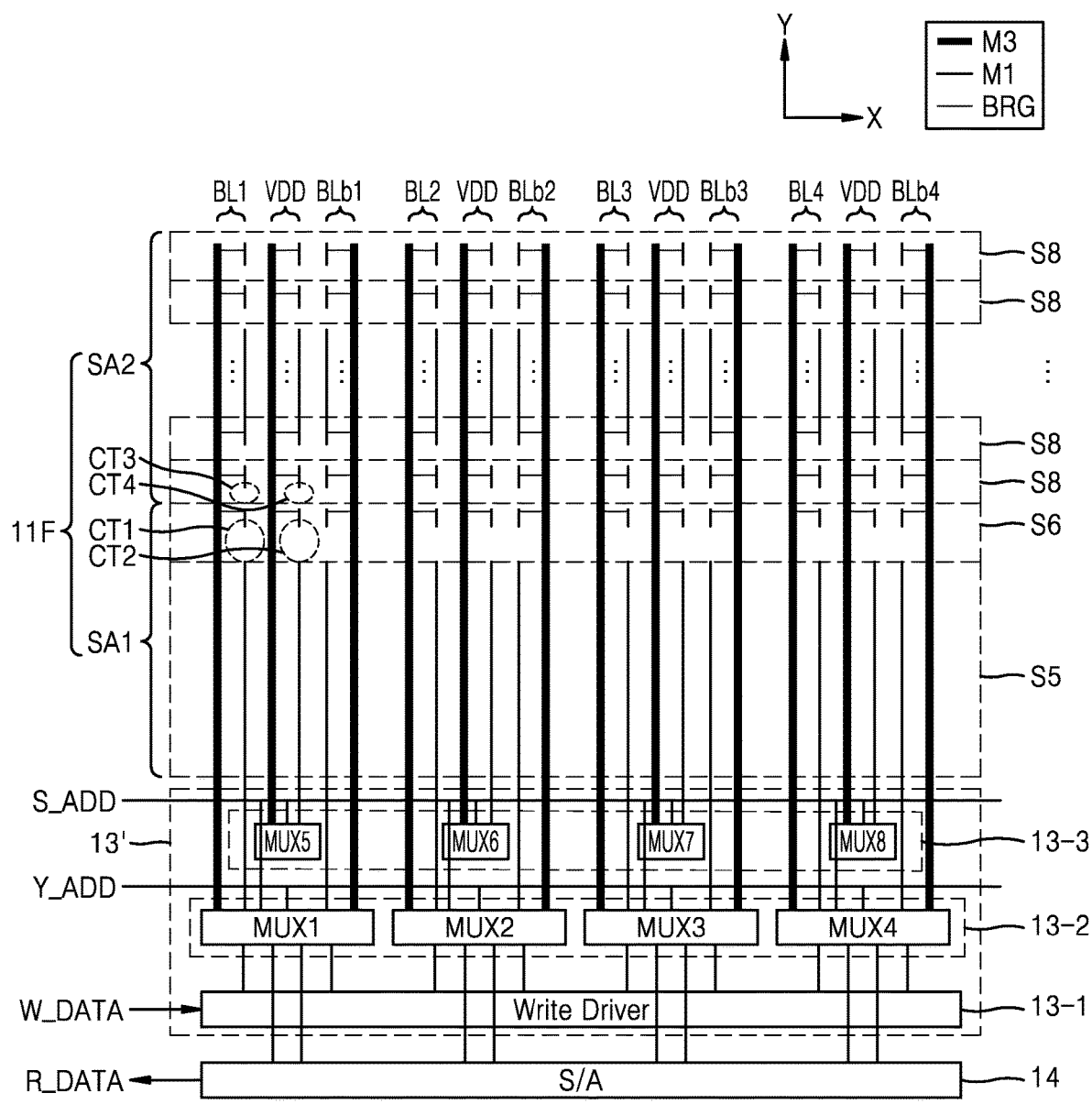
FIG. 18 is a diagram showing a partitioned dual bit line structure and partitioned dual power line structure, according to some embodiments.
Figure 19:
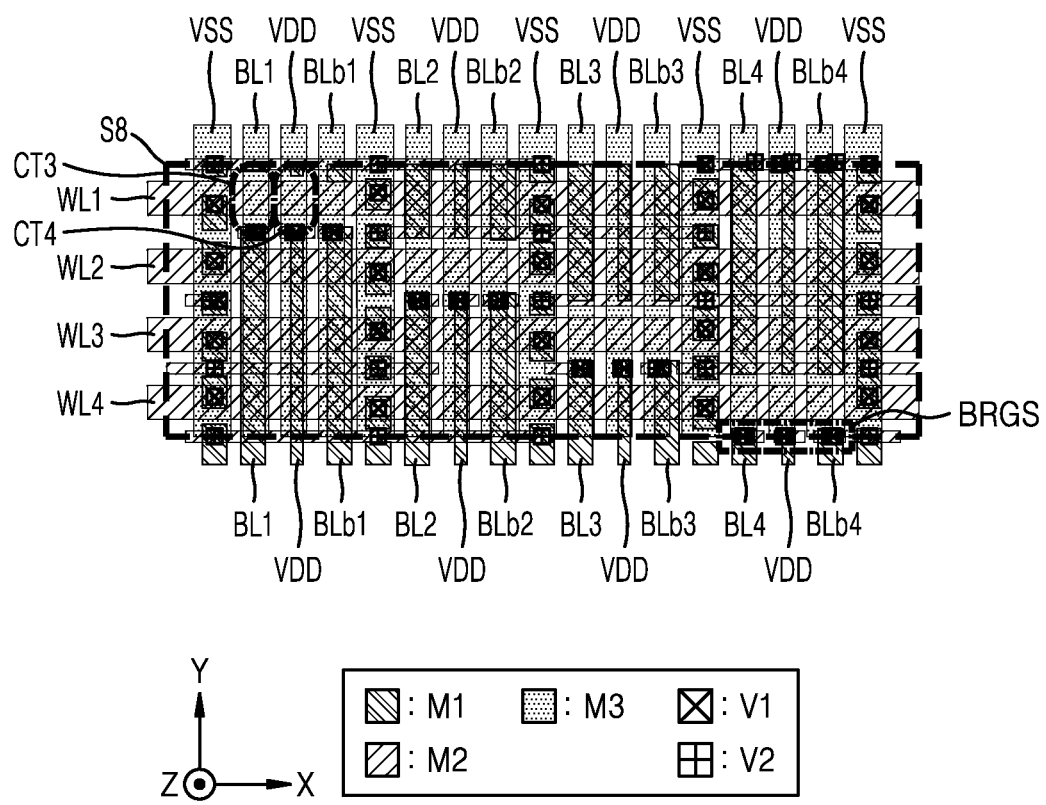
FIG. 19 is a layout diagram of an eighth structure of FIG. 18, according to some embodiments.

FIG. 18 is a diagram showing a partitioned dual bit line structure and partitioned dual power line structure, according to some embodiments. FIG. 19 is a layout diagram of an eighth structure of FIG. 18, according to some embodiments. In detail, FIG. 18 shows another embodiment of FIG. 12, and FIG. 19 is a layout diagram showing an eighth structure S8 of FIG. 18. The description with reference to FIG. 18 focuses on the differences from FIG. 12, and redundant descriptions thereof are omitted.

Referring to FIG. 18, the second sub-array SA2 of a memory cell array 11F may include the eighth structure S8 that is repeated. The eighth structure S8 may include a layout described below with reference to FIG. 19. Accordingly, the bridges BRGs may all be formed in the boundary of the bit cells 12 of FIG. 1. As the eighth structure S8 is repeated in the second direction Y, the bridge BRG may be repeatedly formed in the second sub-array SA2. Accordingly, the resistance of the second sub-array SA2 may be reduced.

Furthermore, the eighth structure S8 may include a third cutting portion CT3 and a fourth cutting portion CT4. The third cutting portion CT3 and the fourth cutting portion CT4 may correspond to disconnections between portions of the first metal wiring M1 in the eighth structure S8, and for example, may correspond to parts of the first metal wiring M1 in the eighth structure S8. The third cutting portion CT3 may partially cut, in the eighth structure S8, the first metal wiring M1 corresponding to the bit lines BL1-BL4 and the complementary bit lines BLb1-BLb4, and the fourth cutting portion CT4 may partially cut, in the eighth structure S8, the first metal wiring M1 corresponding to the power lines. The third cutting portion CT3 and the fourth cutting portion CT4 may partially cut off the electrical connection of the first metal wiring M1 in the second sub-array SA2. Accordingly, the capacitance of the second sub-array SA2 may be reduced.

Referring to FIG. 19, the eighth structure S8 may have a layout similar to the seventh structure S7" of FIG. 16. Accordingly, the eighth structure S8 may include the bridge BRG arranged in the boundary of the bit cells 12 of FIG. 1. Accordingly, an additional space for forming the bridge BRG may be unnecessary.

The eighth structure S8, unlike the seventh structure S7" of FIG. 16, may further include the third cutting portion CT3 and the fourth cutting portion CT4. The third cutting portion CT3 may correspond to disconnections between portions of the first metal wiring M1 in the eighth structure S8, and for example, may correspond to parts of the first metal wiring M1 constituting the bit lines BL1-BL4 and the complementary bit lines BLb1-BLb4, and the fourth cutting portion CT4 may partially cut the first metal wiring M1 constituting the power lines. Accordingly, the electrical connection between the eighth structures S8 via the first metal wiring M1 arranged to neighbor each other in the second direction Y may be cut off.

Figure 20:
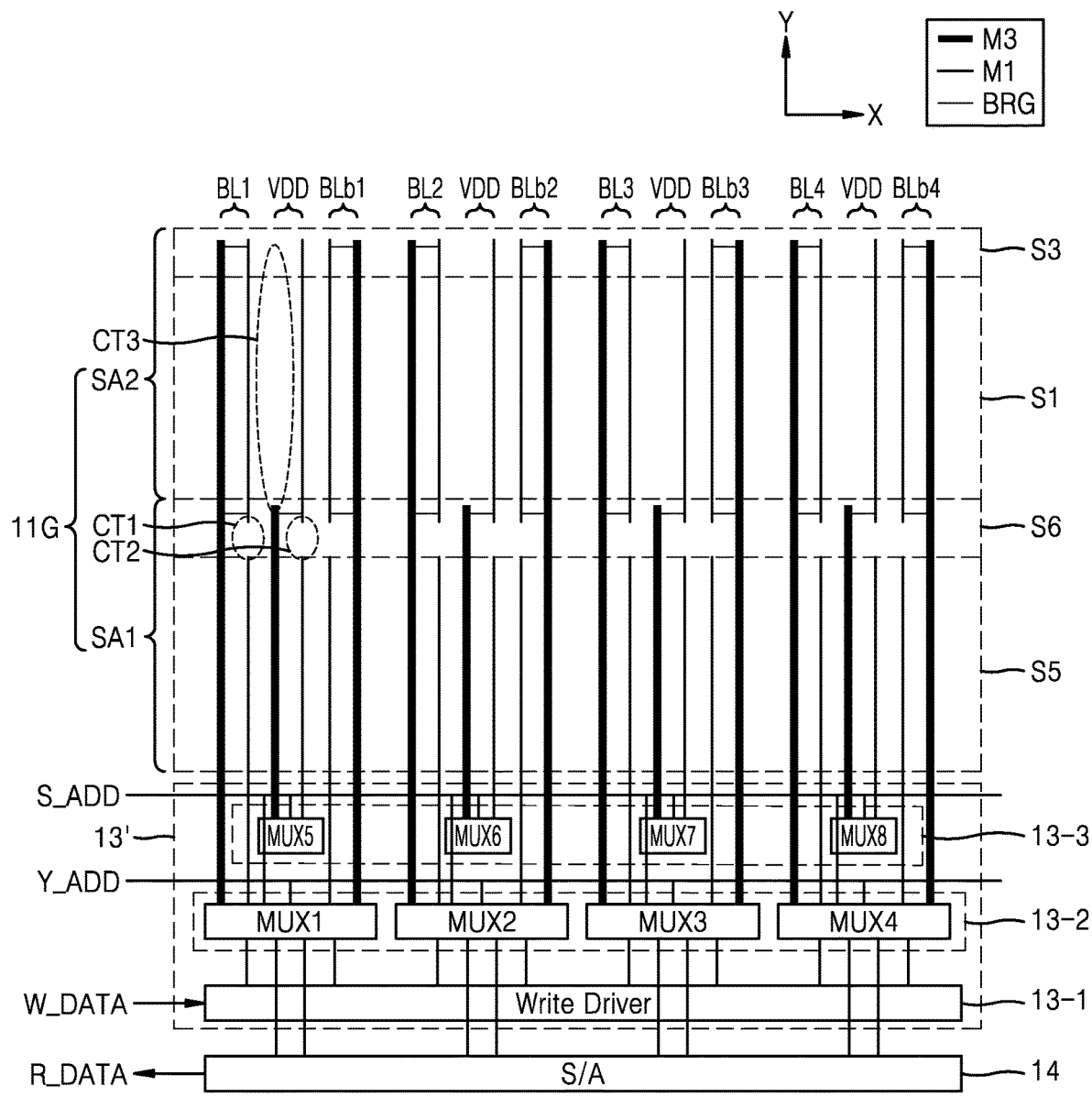
FIG. 20 is a diagram showing a partitioned dual bit line structure and partitioned dual power line structure, according to some embodiments.
Figure 21:
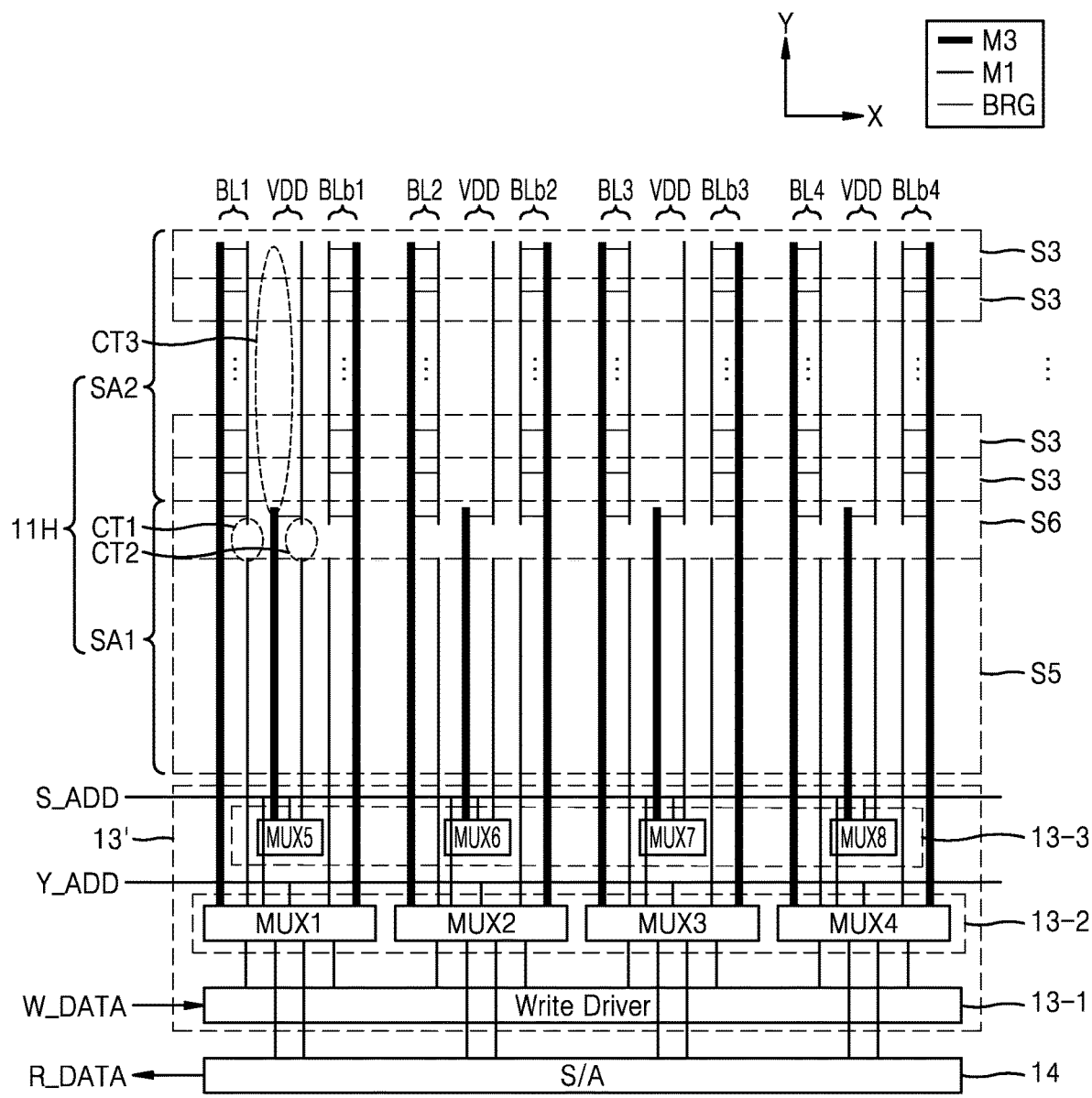
FIG. 21 is a diagram showing a partitioned dual bit line structure and partitioned dual power line structure, according to some embodiments.
Figure 22:
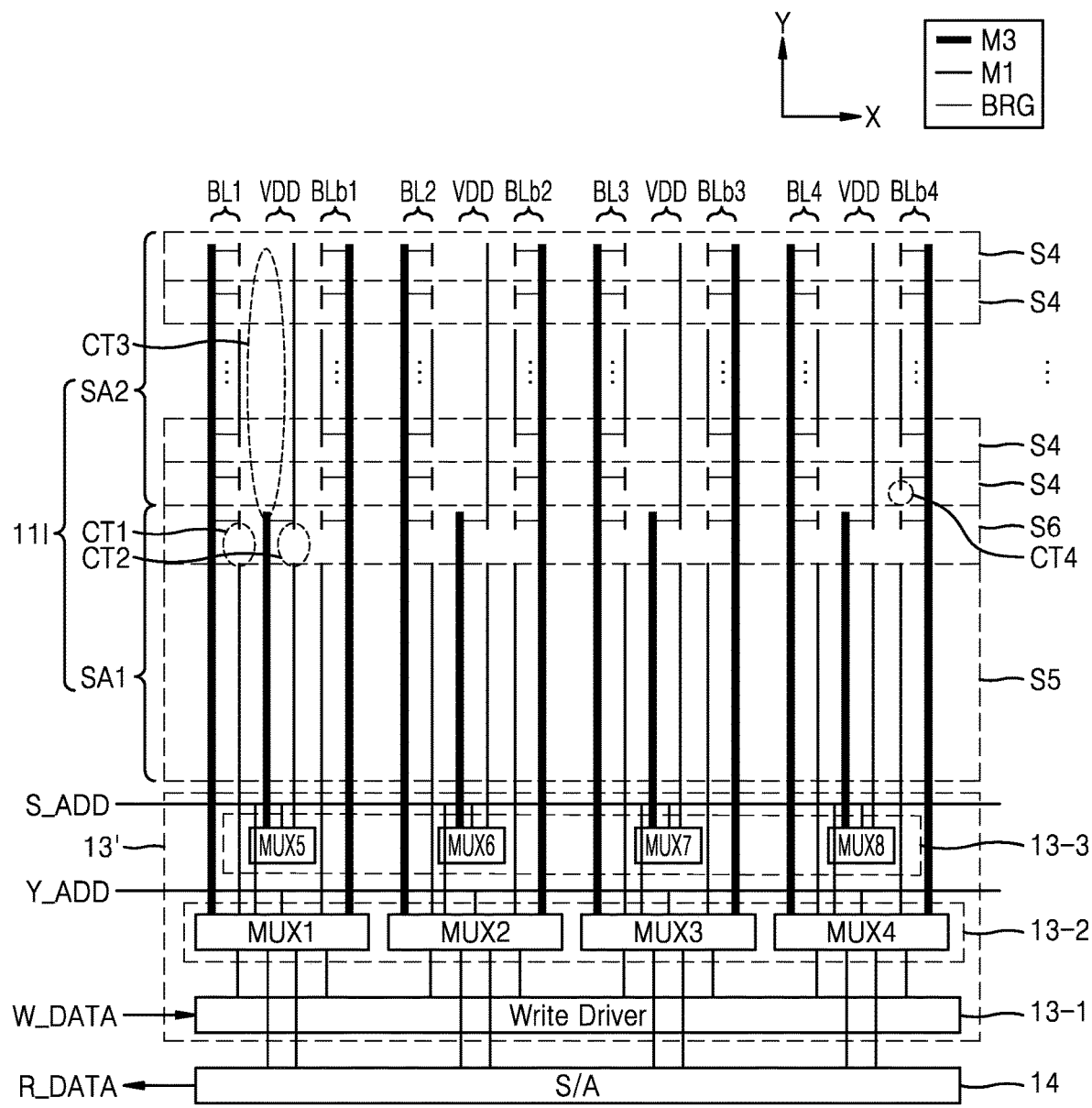
FIG. 22 is a diagram showing a partitioned dual bit line structure and partitioned dual power line structure, according to some embodiments.

FIGS. 20 to 22 are diagrams showing a partitioned dual bit line structure and partitioned dual power line structure, according to some embodiments. In detail, FIGS. 20 to 22 show other embodiments of FIG. 12. The descriptions with reference to FIGS. 20 to 22 focus on the differences from FIG. 12, and redundant descriptions thereof are omitted.

Referring to FIG. 20, the second sub-array SA2 of a memory cell array 11G may include the first structure S1 of FIG. 5 and the third structure S3 of FIG. 7. The first structure S1 of FIG. 5 and the third structure S3 of FIG. 7 may further include the third cutting portion CT3, compared with the fifth structure S5 and the seventh structure S7 of FIG. 12. The power lines included in the first structure S1 of FIG. 5 and the third structure S3 of FIG. 7 may include the first metal wiring M1 only. Accordingly, the third structure S3 may not include the bridge BRG.

As the first sub-array SA1 of the memory cell array 11G includes the fifth structure S5 of FIG. 12 and the sixth structure S6 of FIG. 12, and the second sub-array SA2 includes the first structure S1 of FIG. 5 and the third structure S3 of FIG. 7, the capacitance of the power lines may be reduced.

Referring to FIG. 21, the second sub-array SA2 of a memory cell array 11H may include the third structure S3 of FIG. 7 that is repeated. Accordingly, the bridge BRG may be formed in the boundary of the bit cells 12 of FIG. 1. As the third structure S3 is repeated in the second direction Y, the bridge BRG may be repeatedly formed in the second sub-array SA2. Accordingly, the resistance of the bit lines BL1-BL4 and the complementary bit lines BLb1-BLb4 included in the second sub-array SA2 may be reduced.

Referring to FIG. 22, the second sub-array SA2 of a memory cell array 11I may include the fourth structure S4 of FIG. 11 that is repeated. Accordingly, the bridge BRG may be formed in the boundary of the bit cells 12 of FIG. 1. As the fourth structure S4 is repeated in the second direction Y, the bridge BRG may be repeatedly formed in the second sub-array SA2, Furthermore, the fourth structure S4 of FIG. 11 of the memory cell array 11I may include the fourth cutting portion CT4. The fourth cutting portion CT4 may correspond to disconnections between portions of the first metal wiring M1, and for example, may correspond to parts of the first metal wiring M1 corresponding to the bit lines BL1-BL4 and the complementary bit lines BLb1-BLb4 in the fourth structure S4. Accordingly, the fourth cutting portion CT4 may correspond to disconnections between portions of the first metal wiring M1 corresponding to the bit lines BL1-BL4 and the complementary bit lines BLb1-BLb4 in the second sub-array SA2. Accordingly, the capacitance of the bit lines BL1-BL4 and the complementary bit lines BLb1-BLb4 included in the second sub-array SA2 may be reduced.

Figure 23:
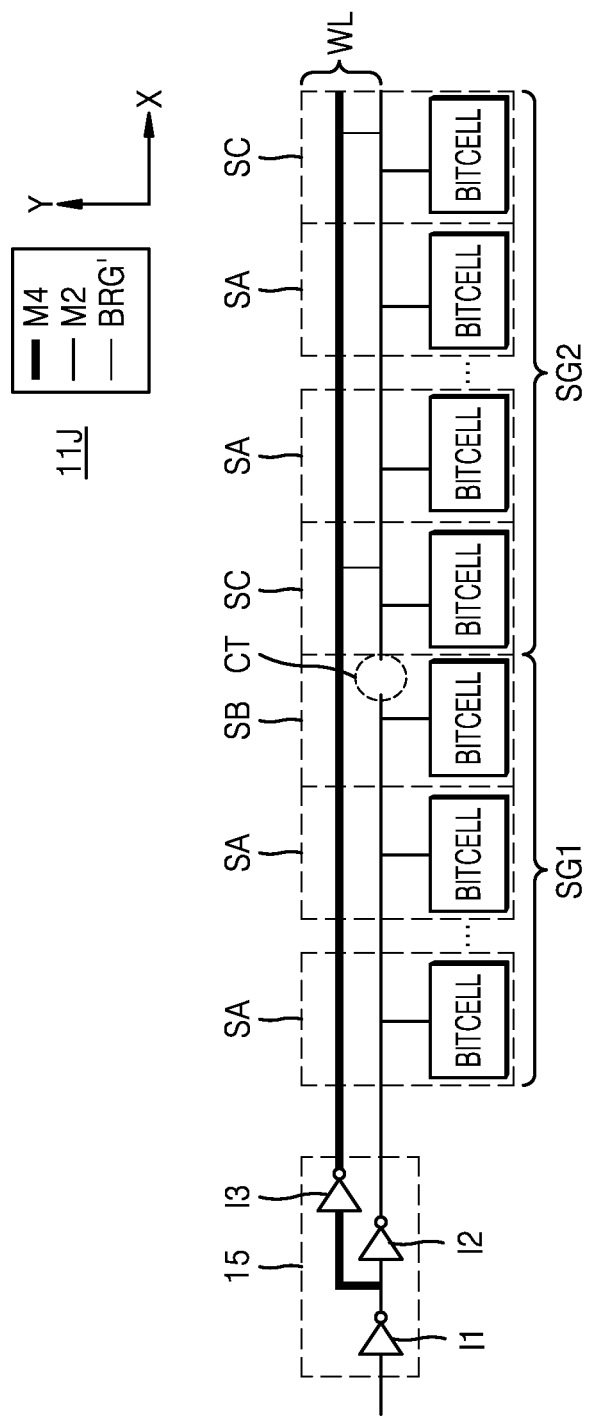
FIG. 23 is a diagram showing a partitioned dual word line structure according to some embodiments.

FIG. 23 is a diagram showing a partitioned dual word line structure according to some embodiments. FIG. 23 shows the arrangement of metal wirings constituting the word lines WLs of FIG. 1, and the bit lines BLs of FIG. 1 constituting a memory cell array 11J and the power lines for supplying a voltage to the memory cell array 11J may not be illustrated.

Referring to FIG. 23, the word line WL constituting the memory cell array 11J may be implemented by using the second metal wiring M2 and the fourth metal wiring M4. The second metal wiring M2 and the fourth metal wiring M4 may have a stack structure as described below with reference to FIG. 26. The second metal wiring M2 may be formed on a first metal wiring M1 of FIG. 26, and the fourth metal wiring M4 may be formed on a third metal wiring M3 of FIG. 26. Although the second metal wiring M2 and the fourth metal wiring M4 may at least partially overlap each other in the third direction Z perpendicular to the first direction X and the second direction Y, in some drawings below including FIG. 23, for convenience of explanation, the second metal wiring M2 and the fourth metal wiring M4 may be illustrated as being parallel to each other.

The memory cell array 11J may include a first segment SG1 and a second segment SG2. The first segment SG1 and the second segment SG2 may be arranged adjacent to each other in the first direction X.

The first segment SG1 may include a first structure SA and a second structure SB. The first structure SA may be arranged adjacent to the row driver 15, and a plurality of first structures SA may be repeatedly arranged in the first direction X. The first segment SG1 may include one second structure SB, and the second structure SB may be arranged in the boundary between the first segment SG1 and the second segment SG2. The first structure SA and the second structure SB may be adjacent to each other in the first direction X.

The word line WL constituting the first structure SA and the second structure SB may be implemented by the second metal wiring M2 extending in the first direction X and the fourth metal wiring M4 extending in the first direction X and at least partially overlapping the second metal wiring M2 along the third direction Z. The second structure SB may include the cutting portion CT. The cutting portion CT may correspond to disconnections between portions the second metal wiring M2. Accordingly, the cutting portion CT may cut off the electrical connection between the first segment SG1 and the second segment SG2 via the second metal wiring M2.

The second segment SG2 may include the first structure SA and a third structure SC. The third structure SC may be arranged at both ends of the second segment SG2, and the first structure SA may be repeatedly arranged in the first direction X between the third structures SC. The first structure SA and the third structure SC may be adjacent to each other in the first direction X. The word line WL constituting the first structure SA and the third structure SC may be implemented by the second metal wiring M2 extending in the first direction X and the fourth metal wiring M4 extending in the first direction X and at least partially overlapping the second metal wiring M2 along the third direction Z, and the third structure SC may further include a bridge BRG'. The bridge BRG' may electrically connect the second metal wiring M2 to the fourth metal wiring M4.

The row driver 15 may include a plurality of inverters I1-I3. Although FIG. 23 illustrates that the row driver 15 includes three inverters, this is an example for explanation, and the row driver 15 may include two inverters or four or more inverters. The row driver 15 may select one word line WL of the word lines WLs of FIG. 1, and any one of the first segment SG1 and the second segment SG2 may be selected.

According to an embodiment, as the memory cell array 11J includes a partitioned dual word line structure, each of the first segment SG1 and the second segment SG2 may be controlled. Accordingly, the resistance of the word line WL included in the memory cell array 11J, and the capacitance of the memory cell array 11J may be reduced.

Although the illustration of the bit lines and the power lines is omitted in the following drawings including FIG. 23, the following embodiments including the memory cell array 11J of FIG. 23 may be implemented with at least one of the partitioned dual bit line structure and the partitioned dual power line structure described above with reference to FIGS. 1 to 22. For example, in an embodiment, the partitioned dual word line structure and the partitioned dual bit line structure may be implemented together in one memory cell array, and the partitioned dual word line structure, the partitioned dual bit line structure, and the partitioned power line structure may be implemented together in one memory cell array.

Figure 24:
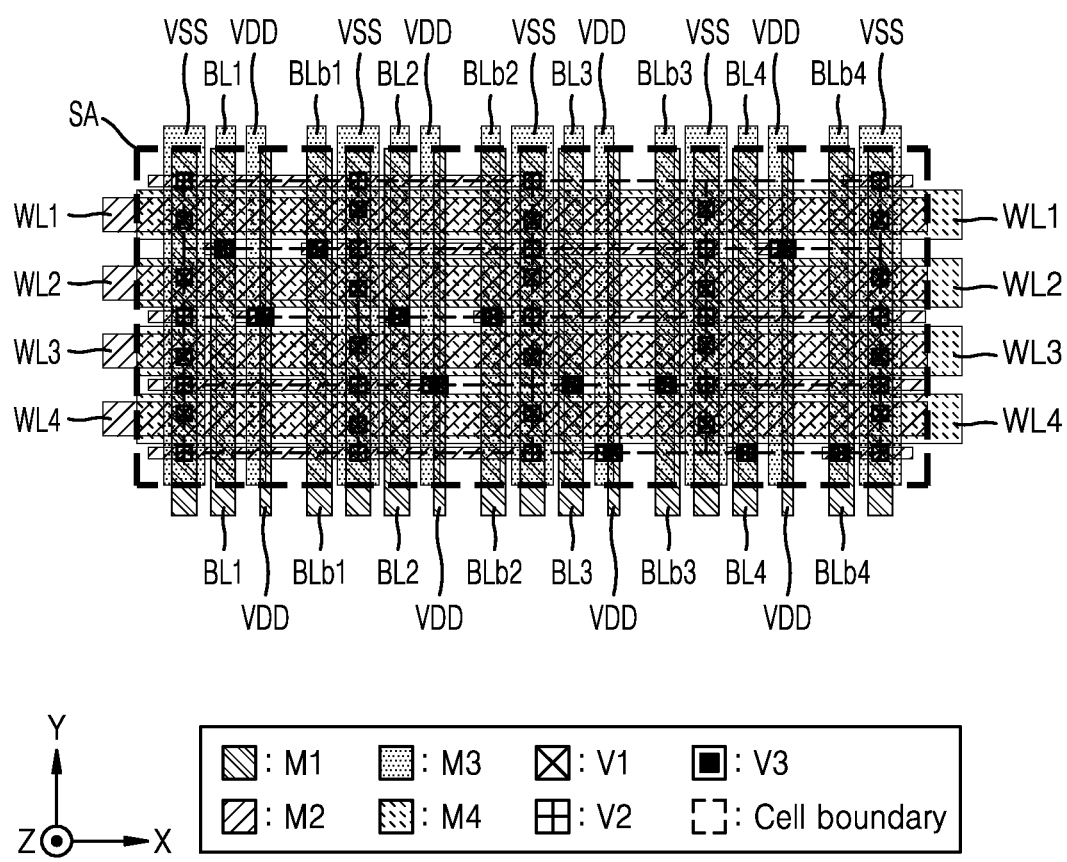
FIG. 24 is a layout diagram of a first structure of FIG. 23, according to some embodiments.
Figure 25:
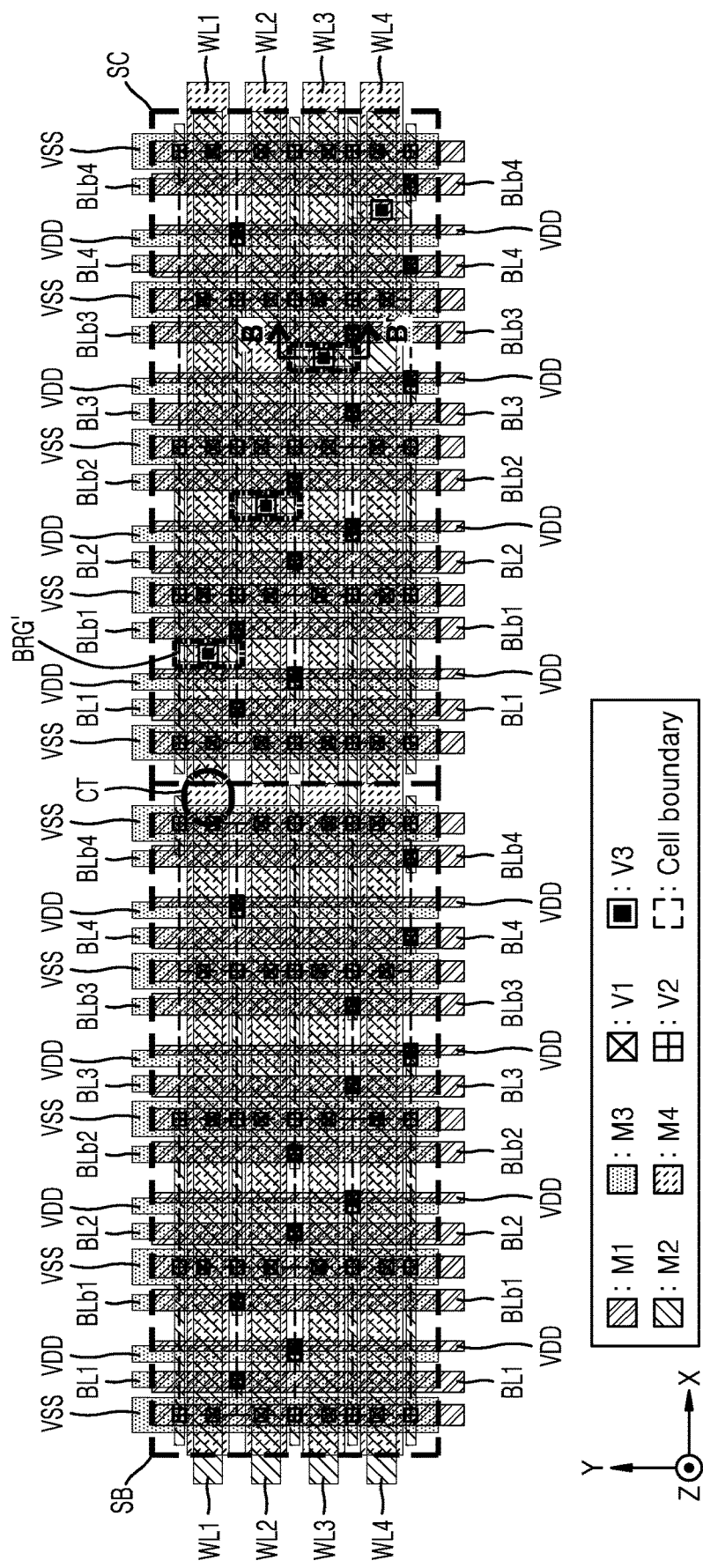
FIG. 25 is a layout diagram of a second structure and a third structure of FIG. 23, according to some embodiments.

FIG. 24 is a layout diagram of the first structure SA of FIG. 23, according to some embodiments. FIG. 25 is a layout diagram of the second structure SB and the third structure SC of FIG. 23, according to some embodiments. In the following description, an embodiment in which a memory cell array employing the partitioned dual bit line structure and the partitioned dual power line structure, as well as the partitioned dual word line structure, is described. Accordingly, the arrangement of the first to fourth bit lines BL1-BL4, the first to fourth complementary bit lines BLb1-BLb4, and the power lines represented in the following layout diagram may be the same as the fifth structure S5 of FIG. 13. In the following description, descriptions are provided with reference to FIGS. 13 and 23, like reference numerals denote like constituent elements and redundant descriptions thereof are omitted.

Referring to FIG. 24, the first to fourth word lines WL1-WL4 may be implemented by using the second metal wiring M2 and the fourth metal wiring M4. In the first structure SA, second metal wirings M2 may be spaced apart from each other along the second direction Y, and may extend in the first direction X. In the second metal wirings M2, the fourth metal wirings M4 may be spaced apart from each other along the second direction Y, and may extend in the first direction X. The second metal wiring M2 and the fourth metal wiring M4 may at least partially overlap each other in the third direction Z. In the second metal wirings M2, the second metal wiring M2 and the fourth metal wiring M4 may not be electrically connected to each other.

Referring to FIG. 25, the second structure SB, unlike the first structure SA, may further include the cutting portion CT. The cutting portion CT may correspond to disconnections between portions of the second metal wiring M2 corresponding to the first to fourth word lines WL1-WL4. The cutting portion CT may be formed in the boundary between the second structure SB and the third structure SC. As the second structure SB includes the cutting portion CT, the electrical connection between the first segment SG1 and the second segment SG2 via the second metal wiring M2 may be cut off.

The third structure S3, unlike the first structure SA, may further include a bridge BRG'. The bridge BRG' may electrically connect the second metal wiring M2 to the fourth metal wiring M4, to implement the first to fourth word lines WL1-WL4. Accordingly, the bridge BRG' may be formed on the second metal wiring M2 corresponding to the first to fourth word lines WL1-WL4. The bridge BRG' may have a structure as described below with reference to FIG. 26. The bridge BRG' may include the second via V2, the third metal wiring M3, and the third via V3. The bridge BRG' may be formed between the first bit line BL1 and the first complementary bit line BLb1, between the second bit line BL2 and the second complementary bit line BLb2, between a the third bit line BL3 and a fourth complementary bit line BLb4, and between a fourth bit line BL4 and the fourth complementary bit line BLb4. The bridge BRG' may be formed at the center of the bit cells 12 of FIG. 1.

Figure 26:
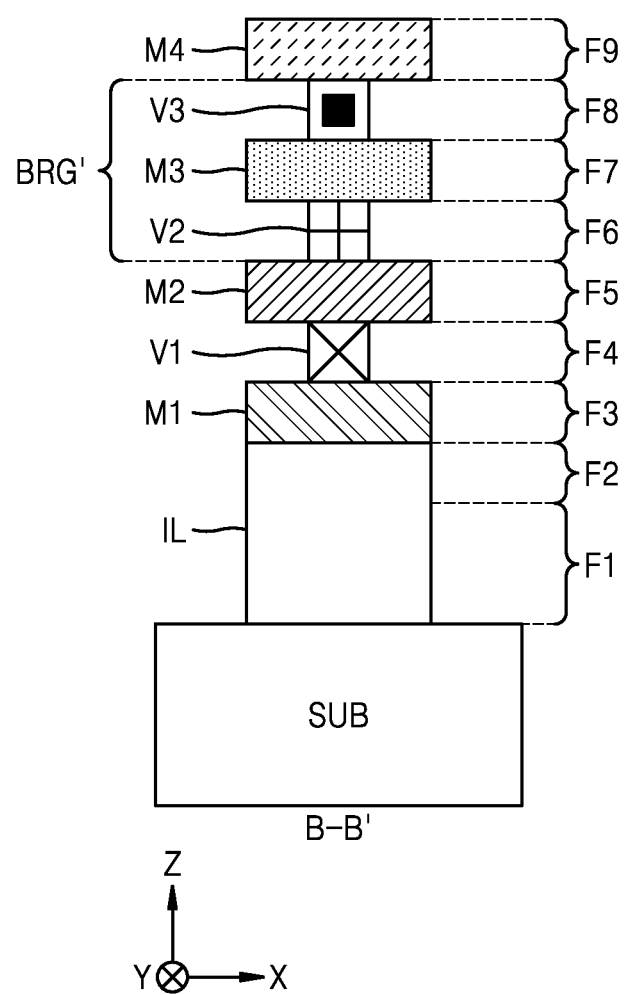
FIG. 26 is a diagram showing a stack structure of a bridge, according to some embodiments.

FIG. 26 is a diagram showing a stack structure of a bridge, according to some embodiments. In detail, FIG. 26 is a schematic view showing the stack structure of the bridge BRG' shown in FIGS. 23 and 25, and is a cross-sectional view taken along line B-B' of FIG. 25. Although FIG. 26 illustrates that the insulating layer IL is formed in the first layer F1 and the second layer F2, the disclosure is not limited thereto.

Referring to FIG. 26, the bridge BRG' may include the second via V2, the third metal wiring M3, and the third via V3. The third metal wiring M3 may extend in the first direction X farther than the second via V2 and the third via V3. The third metal wiring M3 included in the bridge BRG' may be referred to as a "landing pad."

According to the disclosure, as the bridge BRG' is formed at both ends of the second metal wiring M2 included in the second segment SG2 of the memory cell array 11J of FIG. 23, the capacitance of the landing pad M3 may be reduced.

Figure 27:
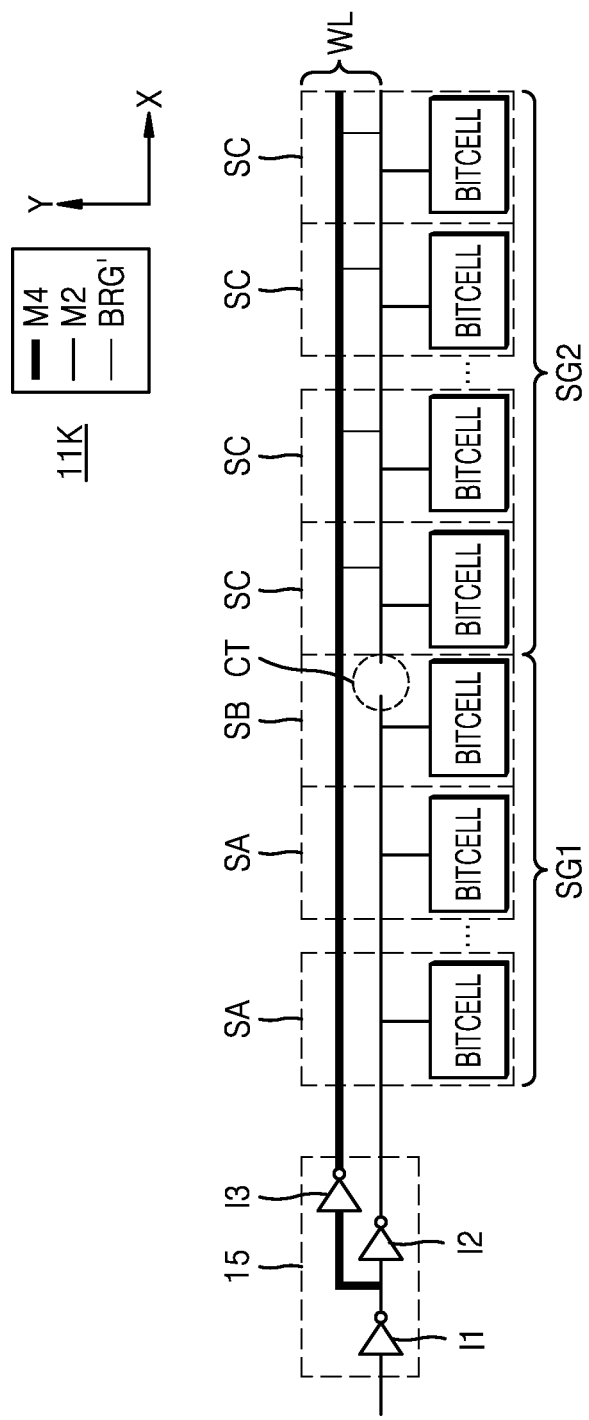
FIG. 27 is a diagram showing a partitioned dual word line structure according to some embodiments.

FIG. 27 is a diagram showing a partitioned dual word line structure according to some embodiments. In detail, FIG. 27 shows another embodiment of FIG. 23. FIG. 27 shows the arrangement of metal wirings constituting word lines, and thus, bit lines and power lines may be omitted in FIG. 27. The description with reference to FIG. 27 focuses on the differences from FIG. 23, and redundant descriptions thereof are omitted.

Referring to FIG. 27, the second segment SG2 of a memory cell array 11K may include the third structure SC that is repeated. The third structure SC may include a layout described above with reference to FIG. 25. The bridge BRG' may be formed in the second segment SG2 of the memory cell array 11K. As the third structure SC is repeated in the first direction X, the bridge BRG' may be repeatedly formed in the second segment SG2. Accordingly, the resistance of the second segment SG2 may be reduced.

Figure 28:
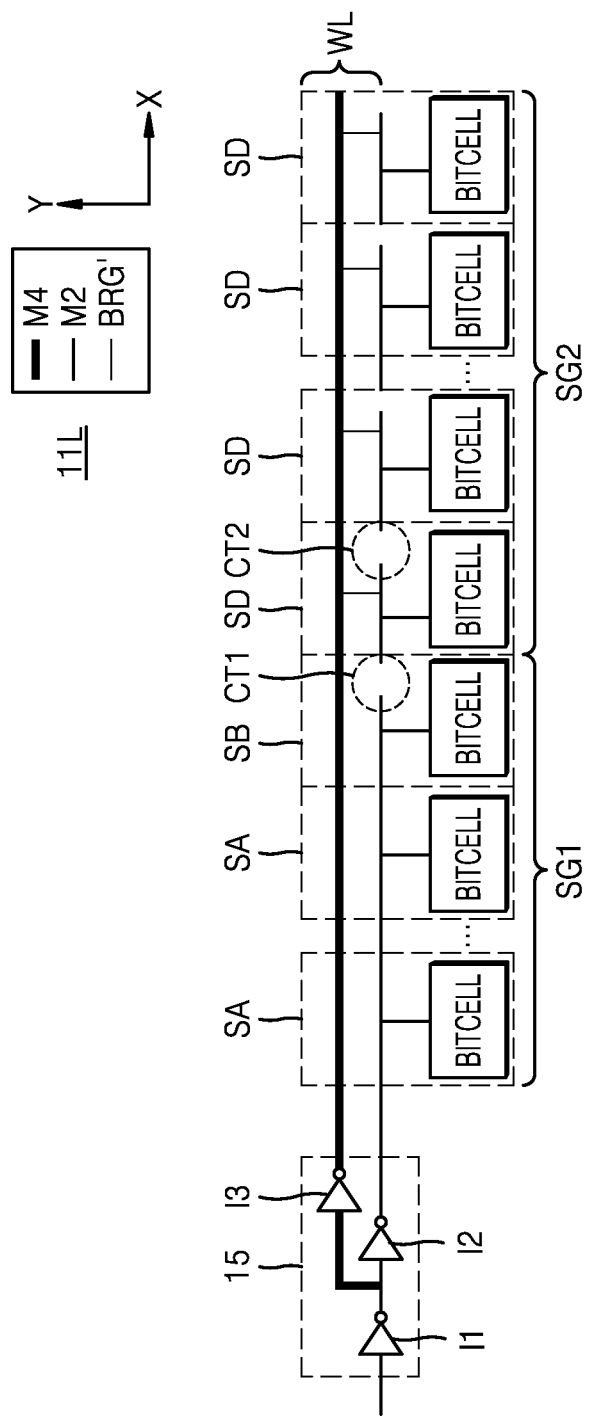
FIG. 28 is a diagram showing a partitioned dual word line structure according to some embodiments.
Figure 29:
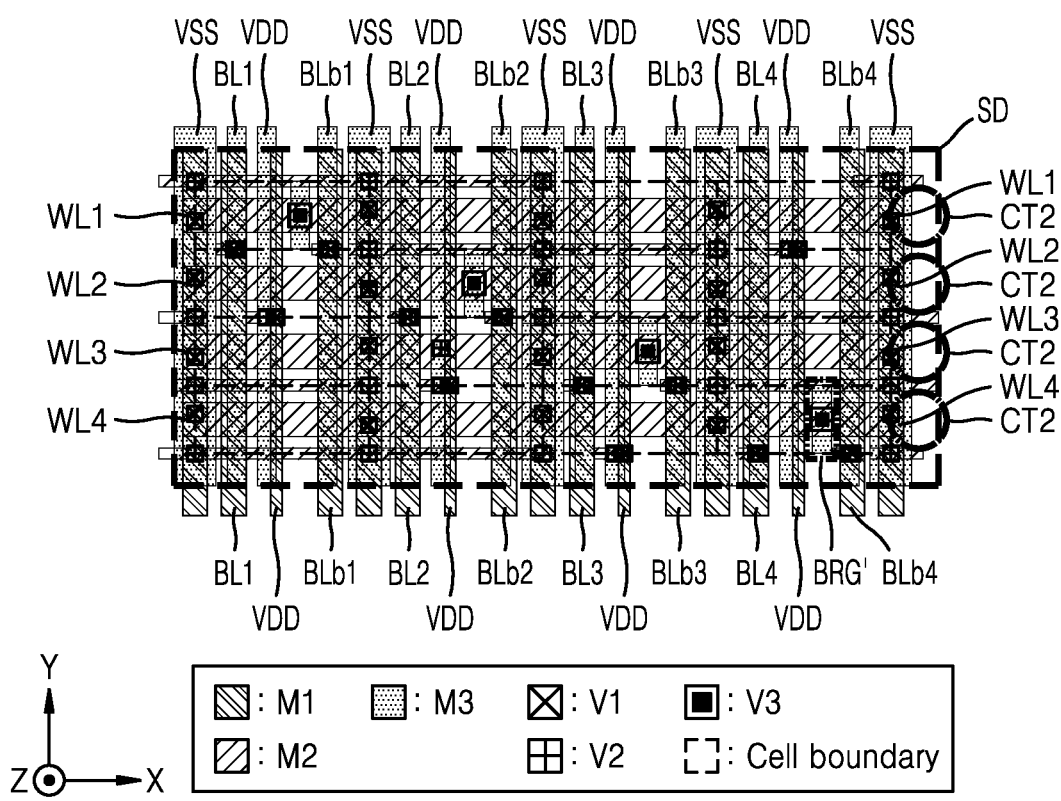
FIG. 29 is a layout diagram of a fourth structure of FIG. 28, according to some embodiments.

FIG. 28 is a diagram showing a partitioned dual word line structure according to some embodiments. FIG. 29 is a layout diagram of a fourth structure SD of FIG. 28, according to some embodiments. In detail, FIG. 28 shows another embodiment of FIG. 23. FIG. 28 shows the arrangement of metal wirings constituting word lines, and bit lines and power lines may be omitted in FIG. 28. The description with reference to FIG. 28 focuses on the differences from FIG. 23, and redundant descriptions thereof are omitted.

Referring to FIG. 28, the second segment SG2 of a memory cell array 11L may include the fourth structure SD. The fourth structure SD may include a layout described below with reference to FIG. 29. Accordingly, the bridge BRG' may be formed at the center of the bit cells 12 of FIG. 1. As the fourth structure SD is repeated in the first direction X, the bridge BRG' may be repeatedly formed in the second segment SG2. Accordingly, the resistance of the second segment SG2 may be reduced.

The second structure SB of the memory cell array 11L may include the first cutting portion CT1, and the fourth structure SD may include the second cutting portion CT2. The first cutting portion CT1 may have the same configuration as the cutting portion CT described above with reference to FIG. 23. The second cutting portion CT2 may correspond to disconnections between portions of the second metal wiring M2 in the fourth structure SD. The second cutting portion CT2 may partially cut off the electrical connection of the second metal wiring M2 in the second segment SG2. Accordingly, the capacitance of the second segment SG2 may be reduced.

Referring to FIG. 29, the fourth structure SD may have a layout similar to the third structure SC. Accordingly, the fourth structure SD, like the third structure SC, may include the bridge BRG' arranged at the center of the bit cells 12 of FIG. 1, and an additional space for forming the bridge BRG' may be unnecessary.

The fourth structure SD, unlike the third structure SC, may further include the second cutting portion CT2. The second cutting portion CT2 may correspond to disconnections between portions of the second metal wiring M2 constituting the word lines WL1-WL4. Accordingly, the electrical connection between fourth structures SD neighboring each other in the first direction X, via the second metal wiring M2, may be cut off.

Figure 30:
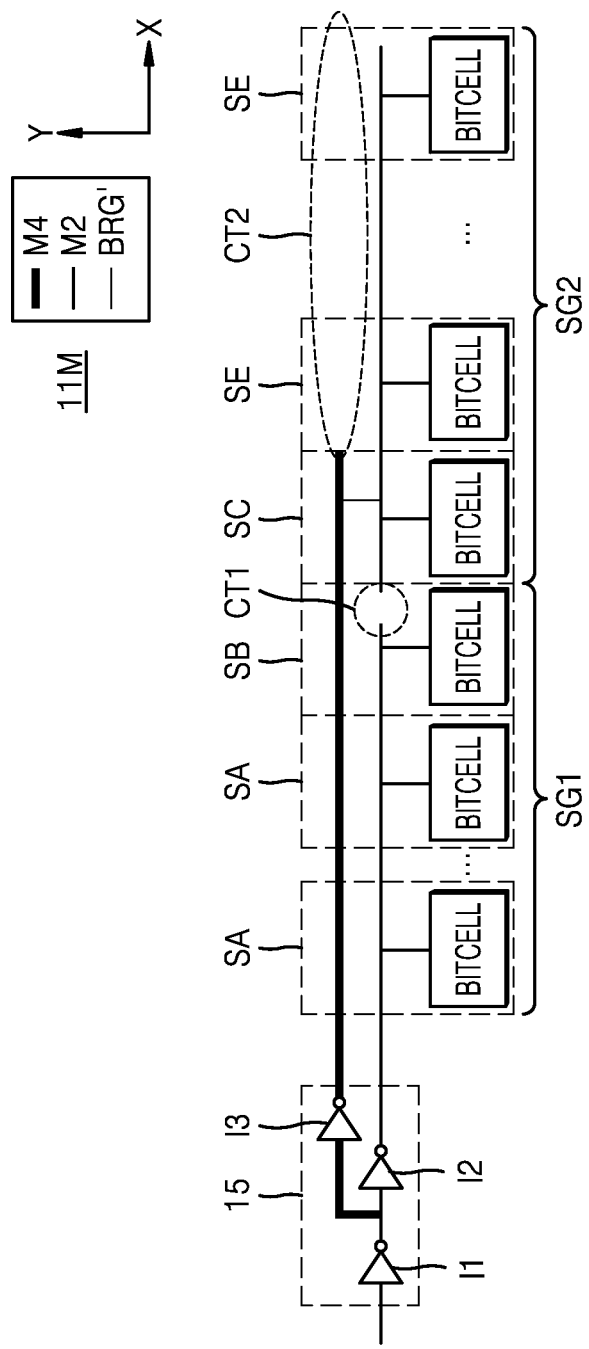
FIG. 30 is a diagram showing a partitioned dual word line structure according to some embodiments.
Figure 31:
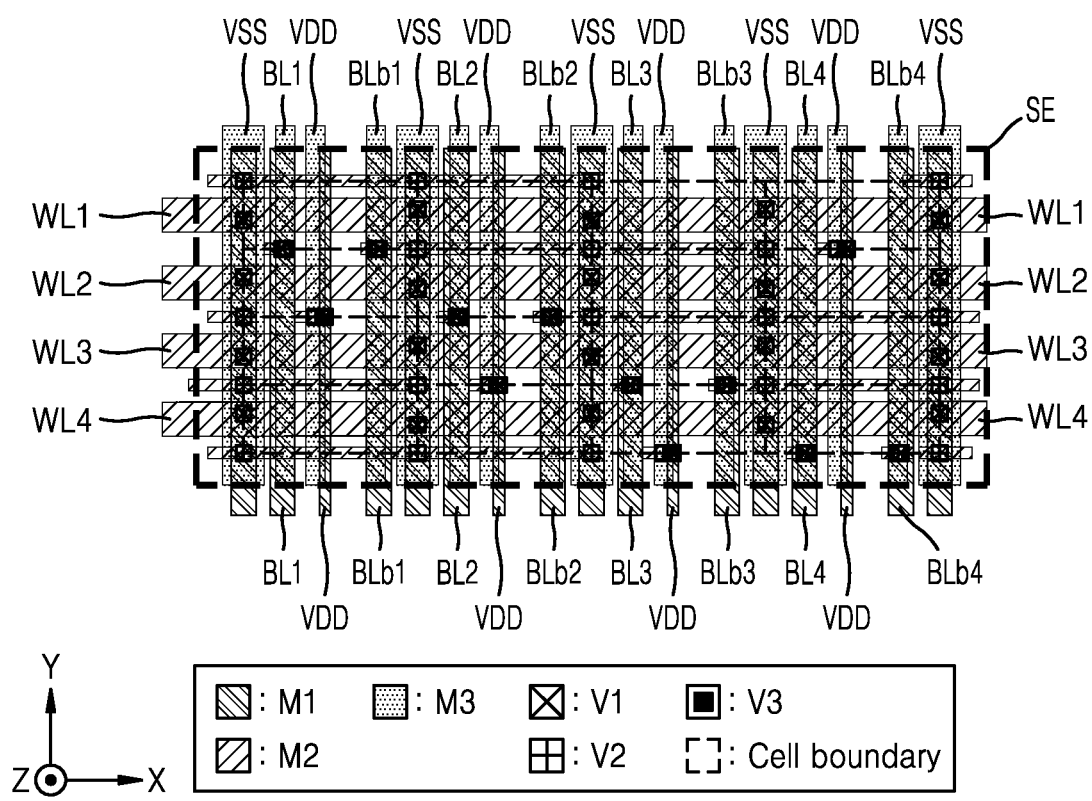
FIG. 31 is a layout diagram of a fifth structure of FIG. 30, according to some embodiments.

FIG. 30 is a diagram showing a partitioned dual word line structure according to some embodiments. FIG. 31 is a layout diagram of a fifth structure SE of FIG. 30, according to some embodiments. In detail, FIG. 30 shows another embodiment of FIG. 23. FIG. 30 shows the arrangement of metal wirings constituting word lines, and bit lines and power lines may be omitted in FIG. 30. The description with reference to FIG. 30 focuses on the differences from FIG. 23, and redundant descriptions thereof are omitted.

Referring to FIG. 30, the second segment SG2 of a memory cell array 11M may include the third structure SC and a fifth structure SE that is repeatedly arranged in the first direction X. The fifth structure SE may include a layout described below with reference to FIG. 31. Although the fifth structure SE has a similar structure to the first structure SA of FIG. 23, the fifth structure SE, unlike the first structure SA of FIG. 23, may further include the second cutting portion CT2. The fifth structure SE may be the same structure as the first structure SA of FIG. 23 that does not include the fourth metal wiring M4. As the fifth structure SE does not include the fourth metal wiring M4, coupling occurring between the third metal wiring M3 of FIG. 26 and the fourth metal wiring M4 may be improved, and the capacitance of the memory cell array 11M may be reduced.

Referring to FIG. 31, the fifth structure SE may have a layout similar to the first structure SA of FIG. 23. The fifth structure SE may be the same structure as the first structure SA of FIG. 23 that does not include the fourth metal wiring M4. Accordingly, the bit cells of the fifth structure SE may be electrically connected to the second metal wiring M2 only.

Figure 32:
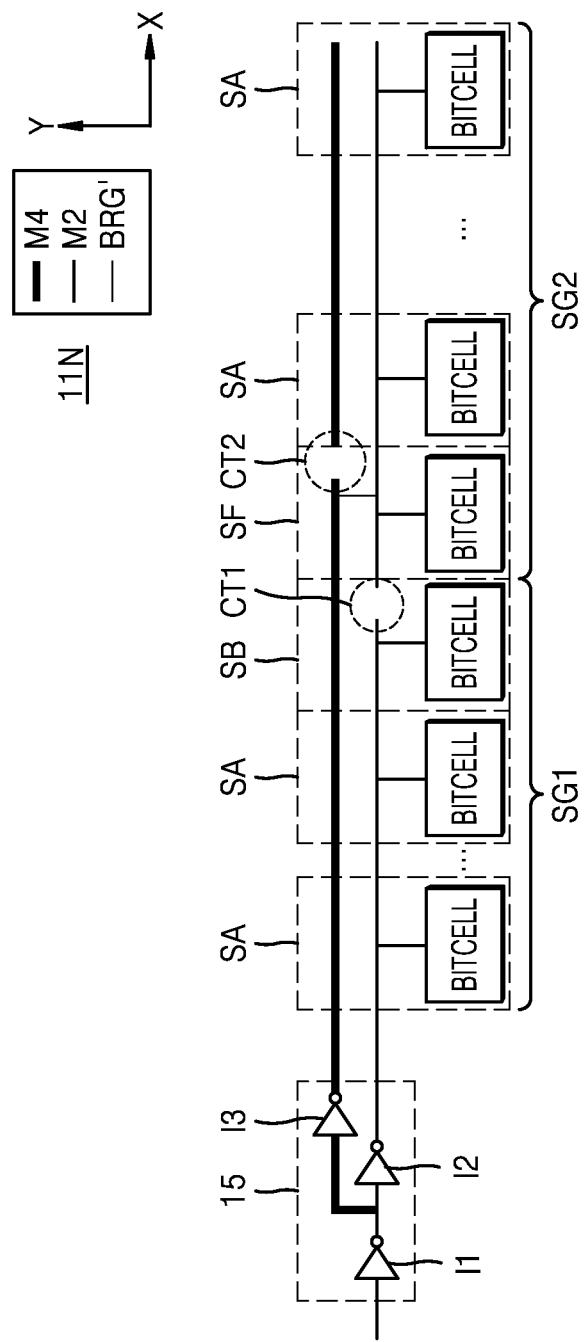
FIG. 32 is a diagram showing a partitioned dual word line structure according to some embodiments.
Figure 33:
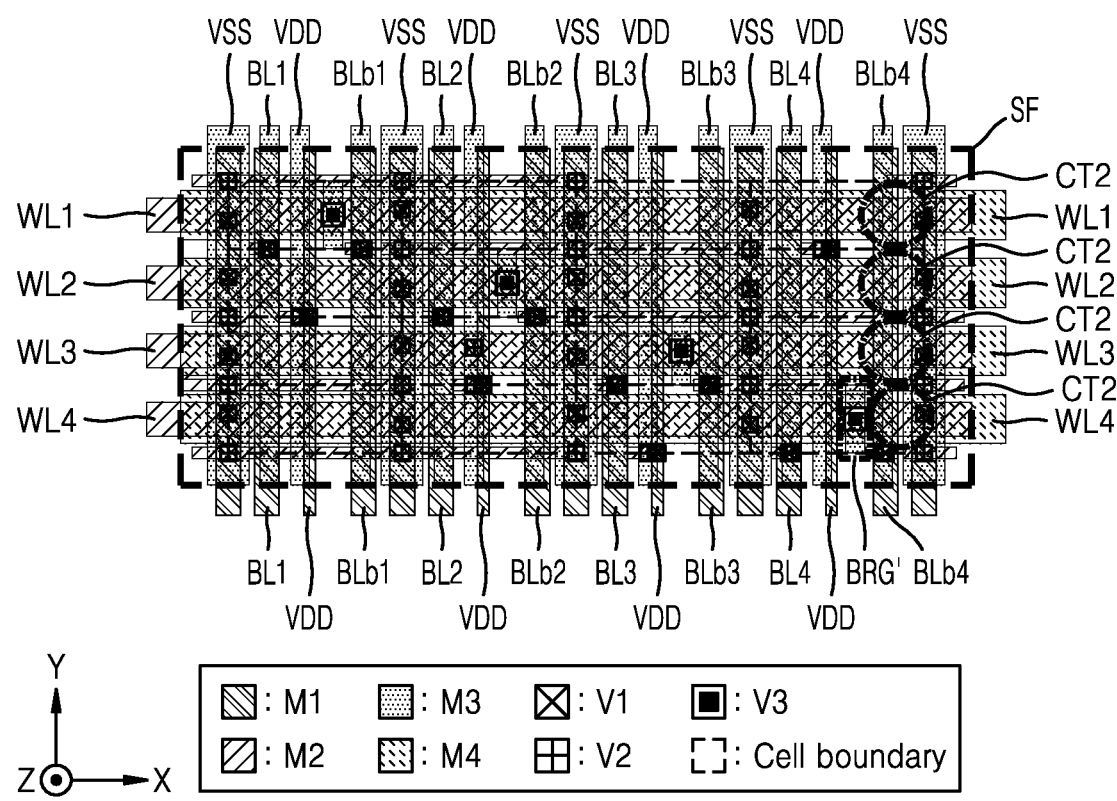
FIG. 33 is a layout diagram of a sixth structure of FIG. 32, according to some embodiments.

FIG. 32 is a diagram showing a partitioned dual word line structure according to some embodiments. FIG. 33 is a layout diagram of a sixth structure SF of FIG. 32, according to some embodiments. In detail, FIG. 32 shows another embodiment of FIG. 23. FIG. 32 shows the arrangement of metal wirings constituting word lines, and bit lines and power lines may be omitted in FIG. 32. The description with reference to FIG. 32 focuses on the differences from FIG. 23, and redundant descriptions thereof are omitted.

Referring to FIG. 32, the second segment SG2 of a memory cell array 11N may include a sixth structure SF and the first structure SA that is repeatedly arranged in the first direction X. The sixth structure SF may be arranged close to the first segment SG1 in the second segment SG2, and the first structure SA may be arranged relatively far from relatively the first segment SG1 in the second segment SG2, compared with the sixth structure SF. The sixth structure SF may include a layout described below with reference to FIG. 33. The sixth structure SF may have a structure similar to the third structure SC of FIG. 23, and unlike the third structure SC of FIG. 23, may further include the second cutting portion CT2. The second cutting portion CT2 may be formed in the fourth metal wiring M4.

Accordingly, in the memory cell array 11N, the electrical connection between the first segment SG1 and the second segment SG2 via the second metal wiring M2 may be cut off by the first cutting portion CT1 formed in the second structure SB of the first segment SG1, and the electrical connection between the sixth structure SF and the first structure SA via the fourth metal wiring M4 may be cut off by the second cutting portion CT2 formed in the sixth structure SF of the second segment SG2. As the sixth structure SF includes the second cutting portion CT2 that corresponds to disconnections between portions of off the electrical connection of the fourth metal wiring M4, the fourth metal wiring M4 formed in the first structure SA of the second segment SG2 may be a dummy metal wiring. As the first structure SA of the second segment SG2 includes a dummy metal wiring, a capacitance difference generated between the third metal wiring M3 of FIG. 26 and the fourth metal wiring M4 may be reduced.

Referring to FIG. 33, the sixth structure SF may have a layout similar to the third structure SC of FIG. 23. The sixth structure SF, unlike the third structure SC of FIG. 23, may further include the second cutting portion CT2, and the second cutting portion CT2 may correspond to disconnections between portions of the fourth metal wiring M4. Accordingly, the electrical connection of the fourth metal wiring M4 in the sixth structure SF may be partially cut off.

Figure 34:
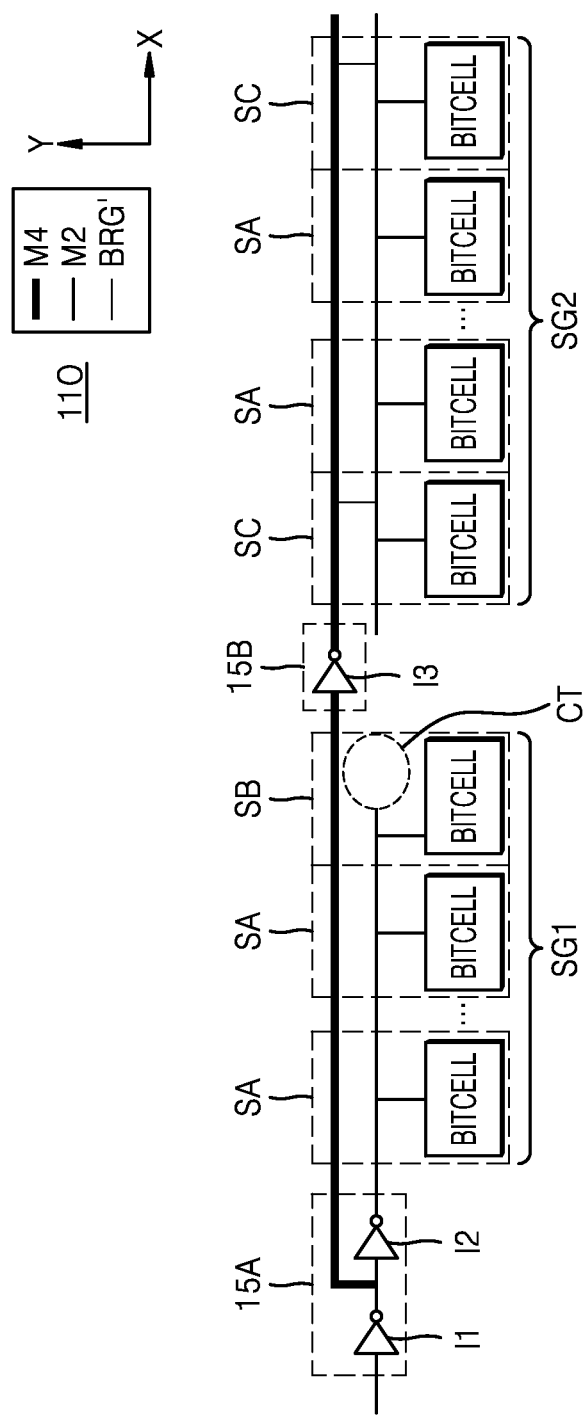
FIG. 34 is a diagram showing a partitioned dual word line structure according to some embodiments.
Figure 35:
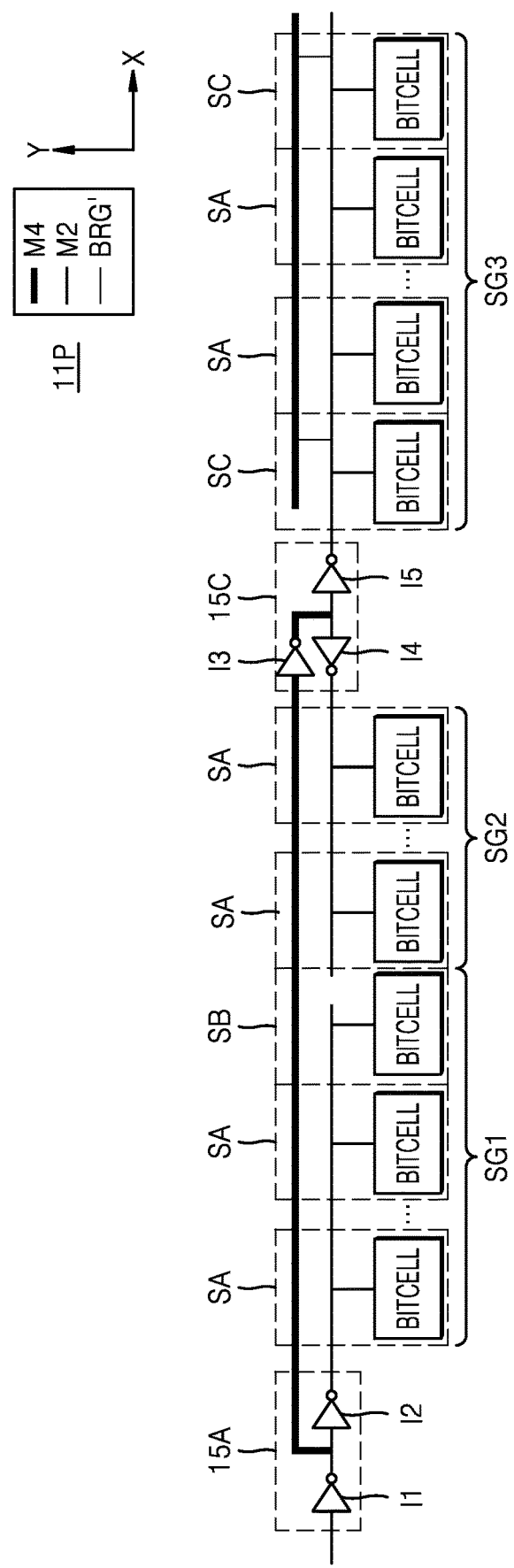
FIG. 35 is a diagram showing a partitioned dual word line structure according to some embodiments.

FIGS. 34 and 35 are diagrams showing a partitioned dual word line structure according to some embodiments. In detail, FIGS. 34 and 35 show embodiments different from the embodiment of FIG. 23. The descriptions with reference to FIGS. 34 and 35 focus on the differences from FIG. 23, and redundant descriptions thereof are omitted.

Referring to FIG. 34, the row driver 15 of FIG. 23 may include a first row driver 15A and a second row driver 15B. The first row driver 15A may include a first inverter I1 and a second inverter I2 connected in series with each other, and the second row driver 15B may include a third inverter I3 connected in parallel to each of the first inverter I1 and the second inverter I2. The second row driver 15B may be arranged between the first segment SG1 and the second segment SG2.

The first segment SG1 and the second segment SG2 of a memory cell array 11O is illustrated as having the same structure as the first segment SG1 and the second segment SG2 of the memory cell array 11J of FIG. 23, but this is an example for explanation. Accordingly, embodiments are not limited to FIG. 34, and the first segment SG1 and the second segment SG2 of the memory cell array 11O may include the structures described above with reference to FIGS. 23 to 33.

According to an embodiment, as the row driver 15 of FIG. 23 includes the first row driver 15A and the second row driver 15B, the slope properties of the word line WL may be improved, and an operation speed may be increased.

Referring to FIG. 35, the row driver 15 of FIG. 23 of a memory cell array 11P may include the first row driver 15A and a third row driver 15C. The first row driver 15A may include the first inverter I1 and the second inverter I2 connected in series with each other, and the third row driver 15C may include the third inverter I3, and a fourth inverter I4 and a fifth inverter I5 connected in parallel to the third inverter I3. The first row driver 15A may be arranged adjacent to the first segment SG1, and the third row driver 15C may be arranged between the first segment SG1 and the second segment SG2.

The structures constituting the first to third segments SG1-SG3 of the memory cell array 11P are examples for explanation only, and the disclosure is not limited thereto. Each of the first to third segments SG1-SG3 of the memory cell array 11P may include at least one of the structures described above with reference to FIGS. 23 to 33. For example, the third segment SG3 may have a structure in which the third structure SC of FIG. 25 is continuously arranged in the first direction X or the fifth structure SE of FIG. 31 is continuously arranged in the first direction X.

According to an embodiment, as the memory cell array 11P includes the first to third segments SG1-SG3, the number of columns to be controlled may be increased. Furthermore, as the row driver 15 of FIG. 23 of the memory cell array 11P includes the first row driver 15A and the third row driver 15C, the slope properties of the word line WL may be improved, and operation speed of an IC may be increased.

Figure 36:
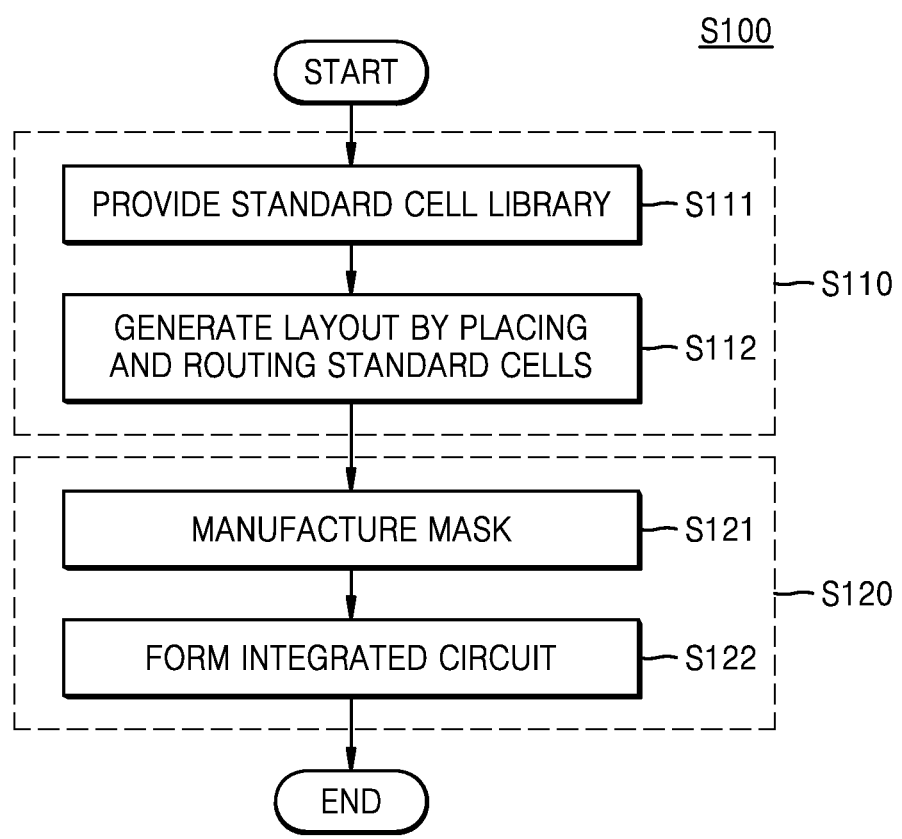
FIG. 36 is a flowchart of a method of manufacturing an integrated circuit, according to some embodiments.

FIG. 36 is a flowchart of a method of manufacturing an IC, according to an embodiment. The IC generated by the method of FIG. 36 may be an IC including the memory cell array described above with reference to FIGS. 3 to 35.

The IC may be defined by a plurality of cells, and may be designed by using a cell library including properties information of a plurality of cells. The cell library may define the name, dimensions, gate width, pin, delay properties, leakage current, threshold voltage, function, and the like of a cell. A general cell library may include a basic cell, such as AND, OR, NOR, an inverter, and the like, a complex cell, such as OR/AND/INVERTER (OAI), AND/OR/INVERTER (AOI), and the like, and a storage element, such as a master-slaver flip-flop, a latch, and the like.

In the embodiments described below, the cell library may be a standard cell library. A standard cell method may refer to a method of preparing a logic circuit block (or cell) with multiple functions in advance and designing a large-scale dedicated IC (LSI) tailored to the specifications of customers or users by arbitrarily combining the cells. A cell is previously designed and verified and registered in a computer, and logic design, placement, and routing by combining the cells using a computer aided design (CAD) may be performed.

In detail, when a large-scale IC is designed/manufactured, if logic circuit blocks (or cells) standardized to a certain scale are already preserved in a library, a logic circuit block suitable for the current design purpose is selected from the library and arranged on a chip as a plurality of cell rows, and thus, the entire circuit may be made by performing optimal wiring to have the shortest wiring length in a wiring space between cells. The more abundant the types of cells preserved in the library are, the more flexible the design is and the greater the possibility of optimal design of the chip is.

Referring to FIG. 36, a method of manufacturing an IC (S100) according to the embodiment may be classified into an IC design operation S110 and an IC manufacturing operation S120.

The IC design operation S110 of designing a layout with respect to an IC may be performed on a tool for designing an IC. The tool for designing an IC may be a program including a plurality of instructions executed on a processor. Accordingly, the IC design operation S110 may be referred to as a computer-implemented method for IC design. The IC manufacturing operation S120 is an operation of manufacturing a semiconductor device according to an IC based on the designed layout, and may be performed on a semiconductor process module.

The IC design operation S110 may include the operations S111 and S112.

In operation S111, a standard cell library may be provided. The standard cell library may include information about a plurality of standard cells. The standard cell library may include layout information, timing information, and the like of a standard cell. The standard cell library may be stored in a computer-readable storage medium. According to an embodiment, operation S111 may include an operation of generating a standard cell library, in detail an operation of designing a standard cell.

A standard cell or an IC formed according to the standard cell may include a structure in which a plurality of layers are stacked, and each of a plurality of layers may include a plurality of patterns.

In operation S112, a layout may be designed by placing and routing (P&R) standard cells by using a standard cell library. In detail, input data for defining an IC may be received. The input data may be synthesized data by using a standard cell library from an abstract form for the behavior of an IC, for example, data defined in a register transfer level (RTL). The input data may be a bitstream or netlist generated as an IC defined by the VHSIC hardware description language (VHDL) and the hardware description language (HDL), such as Verilog, is synthesized. In operation S112, a layout of the memory cell arrays 11A-11P described above with reference to FIGS. 3 to 35 may be designed.

Next, a storage medium for storing a standard cell library is accessed, and standard cells selected according to the input data among a plurality of standard cells stored in the standard cell library may be placed and routed. The placing and routing may indicate arranging selected standard cells and connecting the arranged standard cells. As the placing and routing are completed, a layout of an IC may be generated.

Although the IC design operation S110 is illustrated as including operations S111 and S112, the disclosure is not limited thereto, and the IC design operation S110 may further include various operations according to a general IC design method, such as correction, layout verification, post simulation, and the like of standard cell library.

The IC manufacturing operation S120 may include operations S121 and S122.

In operation S121, a mask may be manufactured based on a layout. Optical proximity correction (OPC) may be performed based on the layout, in which OPC may indicate a process of changing a layout by reflecting an error according to a light proximity effect. Next, a mask may be manufactured according to a layout changed according to an OPC performance result. In this state, a mask may be manufactured by using a layout that reflects OPC, for example, a graphic design system (GDS) that reflects OPC. The number of manufactured masks may correspond to the number of colors assigned to patterned included in a layout.

In operation S122, an IC may be formed by using a manufactured mask. The IC may be formed by performing various semiconductor processes on a semiconductor substrate, such as a wafer, by using the mask manufactured in operation S121. For example, a process of using a mask may indicate a patterning process using a lithography process. A desirable pattern may be formed on a semiconductor substrate or a material layer through the patterning process. The semiconductor process may include a deposition process, an etching process, an ion process, a cleaning process, and the like. The deposition process may include various material layer formation processes, such as CVD, sputtering, spin coating, and the like. An ion process may include processes of ion injection, diffusion, a heat treatment, and the like. Furthermore, the semiconductor process may further include a packaging process in which a semiconductor device is mounted on a PCB and sealed with a sealing member, and a test process of testing a semiconductor device or a package.

Figure 37:
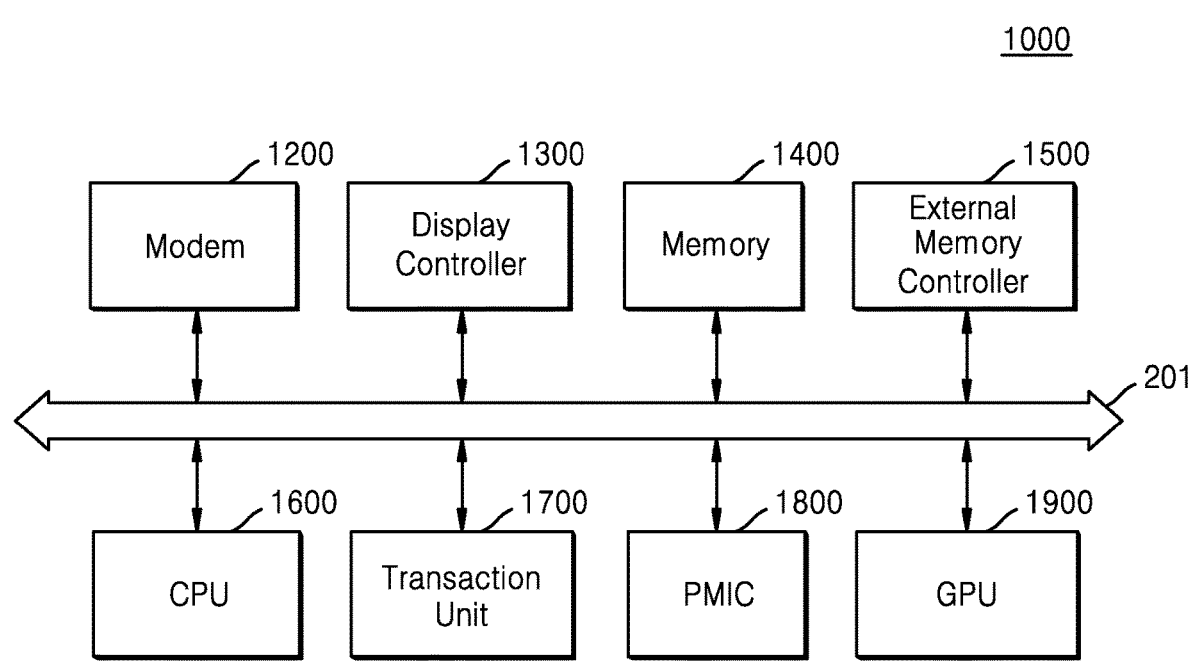
FIG. 37 is a block diagram of a system-on-chip (SoC) including an integrated circuit, according to an embodiment.

FIG. 37 is a block diagram of a system-on-chip (SoC) 1000 including an IC, according to an embodiment.

The SOC 1000, as an IC, may include an IC according to an embodiment. The SOC 1000 is obtained by implementing complex functional blocks such as, intellectual property (IP) block, performing various functions on a single chip, and bit cells arranged according to embodiments may be included in each functional blocks of the SOC 1000. For example, an IP block may include circuitry to perform specific functions, and may have a design that includes a trade secret.

Referring to FIG. 37, the SOC 1000 may include a modem 1200, a display controller 1300, a memory 1400, an external memory controller 1500, a central processing unit (CPU) 1600, a transaction unit 1700, a PMIC 1800, and a graphics processing unit (GPU) 1900, and each functional block of the SOC 1000 may communicate with each other through a system bus 1100.

The CPU 1600 that generally controls the operation of the SOC 1000 may control the operations of other functional blocks 1200, 1300, 1400, 1500, 1700, 1800, and 1900.

The modem 1200 may demodulate signals received from the outside of the SOC 1000, or modulate signals generated inside the SOC 1000 and transmit the modulated signals to the outside.

The display controller 1300, by controlling a display or a display device outside the SOC 1000, may transmit data generated inside the SOC 1000 to the display.

The memory 1400 may include, as a non-volatile memory, electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), and the like, and as a volatile memory, DRAM, static random access memory (SRAM), mobile DRAM, double data rate synchronous dynamic random access memory (DDR SDRAM), low power DDR (LPDDR) SDRAM, graphic DDR (GDDR) SDRAM, Rambus dynamic random access memory (RDRAM), and the like. The memory 1400 may be implemented by the memory cell arrays 11A-11P described above with reference to FIGS. 3 to 35.

The external memory controller 1500 may control an operation of transceiving data with respect to an external IC connected to the SOC 1000. For example, a program and/or data stored in the external IC may be provided to the CPU 1600 or a GPU 1900 under the control of the external memory controller 1500.

The transaction unit 1700 may monitor data transaction of each functional block, and the PMIC 1800 may control power supplied to each functional block under the control of the transaction unit 1700.

The GPU 1900 may execute program instructions related to graphics processing. The GPU 1900 may receive graphics data through the external memory controller 1500, and may transmit the graphics data processed by the GPU 1900 to the outside of the SOC 1000 through the external memory controller 1500.

Figure 38:
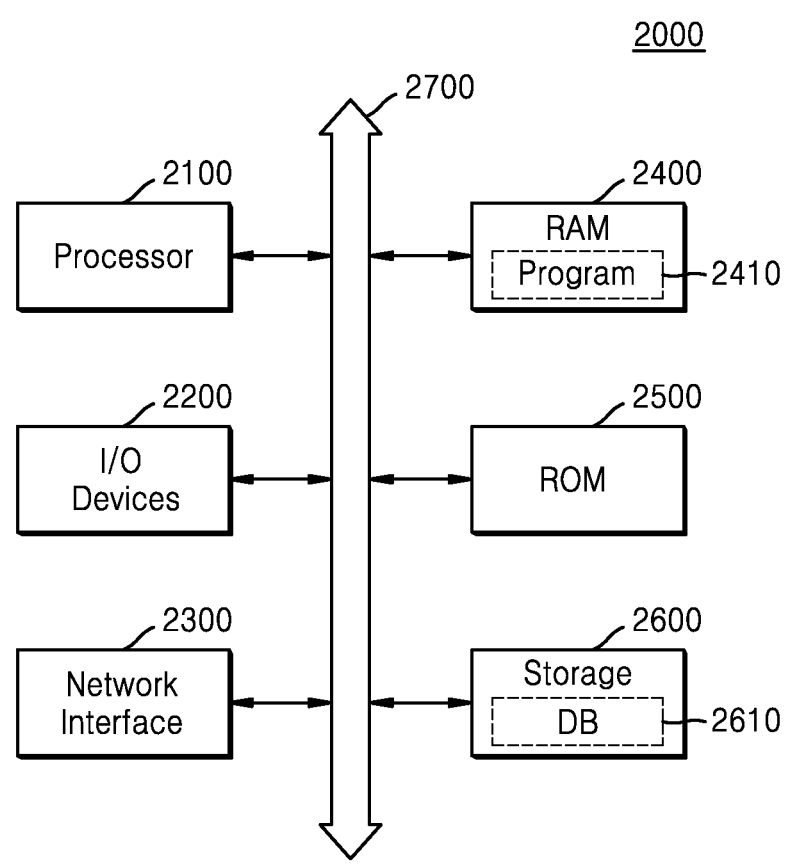
FIG. 38 is a block diagram of a computing system including a memory for storing a program, according to an embodiment.

FIG. 38 is a block diagram of a computing system including a memory for storing a program, according to an embodiment. According to some embodiments, at least some of the operations included in an IC design method, for example, S110 of FIG. 36, and an IC manufacturing method, for example, S120 of FIG. 36, may be executed on a computing system 2000.

Referring to FIG. 38, the computing system 2000 may include a stationary computing system, such as a desktop computer, a workstation, a server, and the like, or a mobile computing system, such as a laptop computer and the like.

The computing system 2000 may include a processor 2100, input/output devices 2200, a network interface 2300, a random access memory (RAM) 2400, a read only memory (ROM) 2500, and a storage 2600. The processor 2100, the input/output devices 2200, the network interface 2300, the RAM 2400, the ROM 2500, and the storage 2600 may be connected to a bus 2700, and may communicated with each other through the bus 2700.

The processor 2100 may be referred to as a processing unit, and may include at least one core of, for example, a micro-processor, an application processor (AP), a digital signal processor (DSP), and a GPU, which are capable of executing a certain instruction set, for example, Intel architecture-32 (IA-32), 64 bit extended IA-32, x86-64, PowerPC, Sparc, MIPS, ARM, IA-64, and the like. For example, the processor 2100 may access, via the bus 2700, a memory, that is, the RAM 2400 or the ROM 2500, and execute instructions stored in the RAM 2400 or the ROM 2500.

The RAM 2400 may store a program 2410 for manufacturing an IC according to an embodiment, or at least part thereof, and the program 2410 may allow the processor 2100 to execute at least part of the operations included in the IC manufacturing method and the operations included in the IC design method. The program 2410 may include a plurality of instructions executable by the processor 2100, and a plurality of instructions included in the program 2410 may allow the processor 2100 to perform, for example, at least part of the operations included in the flowchart described above with reference to FIG. 36. According to an embodiment, the RAM 2400 may include SRAM implemented by the memory cell arrays 11A-11P described above with reference to FIGS. 3 to 35.

The storage 2600 may not lose stored data even when power supplied to the computing system 2000 is cut off. For example, the storage 2600 may include a storage medium, such as a non-volatile IC, a magnetic tape, an optical disc, a magnetic disc storage medium, and the like. Furthermore, the storage 2600 may be attachable/detachable with respect to the computing system 2000. The storage 2600 may store the program 2410 according to an embodiment, and before the program 2410 is executed by the processor 2100, the program 2410 or at least part thereof may be loaded on the RAM 2400 from the storage 2600. Alternatively, the storage 2600 may store a file written in a program language, and the program 2410 generated by a compiler and the like from a file, or at least part thereof, may be loaded on the RAM 2400. Furthermore, the storage 2600 may store a database (DB) 2610, and the DB 2610 may include information, for example, a cell library, necessary for designing an IC.

The storage 2600 may store data to be processed or having been processed by the processor 2100. The processor 2100 may, according to the program 2410, generate data by processing the data stored in the storage 2600, and store the generated data in the storage 2600. For example, the storage 2600 may store a register-transfer level (RTL), a netlist, and/or a layout.

The input/output devices 2200 may include an input device, such as a keyboard, a pointing device, and the like, and an output device, such as a display device, a printer, and the like. For example, a user may trigger the execution of the program 2410 by the processor 2100, input RTL and/or a netlist, or check a layout, through the input/output devices 2200.

The network interface 2300 may provide an access to a network outside the computing system 2000. For example, a network may include a plurality of computing systems and communication links, and the communication links may include wired links, optical links, wireless links, or links of different forms.

While aspects of example embodiments have been particularly shown and described, it will be understood that various changes in form and details may be made therein without departing from the spirit and scope of the following claims.

What is claimed is:

1. An integrated circuit comprising:
   a plurality of bit lines spaced apart from each other along a first direction and extending in a second direction perpendicular to the first direction through a first sub-array and a second sub-array neighboring the first sub-array in the second direction,
   wherein each of the plurality of bit lines comprises:
      a first metal wiring extending in the second direction, the first metal wiring comprising a first portion and a second portion that is separated from the first portion by a first cutting portion;
      a third metal wiring extending in the second direction, and at least partially overlapping the first metal wiring along a third direction perpendicular to the first direction and the second direction; and
      two bridges electrically connecting the first metal wiring to the third metal wiring.

2. The integrated circuit of claim 1, wherein the two bridges comprise:
   a first bridge disposed in the first sub-array between the second sub-array and the first cutting portion; and
   a second bridge disposed in the second sub-array.

3. The integrated circuit of claim 1, wherein each of the two bridges comprises:
   a first via formed on the first metal wiring;
   a second metal wiring formed on the first via, and having a length in the first direction greater than the first via; and
   a second via formed on the second metal wiring.

4. The integrated circuit of claim 1, wherein the first sub-array comprises a plurality of bit cells,
   wherein a first bridge of the two bridges is provided in the first sub-array, and
   wherein the first cutting portion and the first bridge are spaced apart from the plurality of bit cells.

5. The integrated circuit of claim 1, wherein the second sub-array comprises a plurality of bit cells,
   wherein a second bridge of the two bridges is provided in the second sub-array, and
   wherein the second bridge is provided on a boundary of the plurality of bit cells.

6. The integrated circuit of claim 1, wherein the second sub-array further comprises a plurality of bridges spaced apart from each other along the second direction and electrically connecting the first metal wiring and the third metal wiring.

7. The integrated circuit of claim 6, wherein the second sub-array further comprises a second cutting portion repeatedly cutting the first metal wiring constituting the plurality of bit lines, at regular intervals in the second direction.

8. The integrated circuit of claim 1, further comprising a plurality of power lines,
   wherein each of the plurality of power lines is disposed between a corresponding pair of the plurality of bit lines, and comprises:
      a first metal wiring extending in the second direction, the first metal wiring comprising a first portion and a second portion that is separated from the first portion by a second cutting portion;
      a third metal wiring extending in the second direction, and at least partially overlapping the first metal wiring along a third direction perpendicular to the first direction and the second direction; and two bridges electrically connecting the first metal wiring to the third metal wiring.

9. The integrated circuit of claim 8, wherein the second sub-array comprises a plurality of bit cells,
wherein the two bridges formed in each of the plurality of power lines, a bridge disposed in the second sub-array is disposed in a boundary of the plurality of bit cells, and a bridge other than the bridge disposed in the boundary of the plurality of bit cells is spaced apart from the plurality of bit cells.

10. The integrated circuit of claim 8, wherein the second sub-array comprises a plurality of bit cells, and
bridges disposed in the second sub-array of the two bridges disposed in each of the plurality of power lines are all spaced apart from the plurality of bit cells.

11. The integrated circuit of claim 8, wherein the second sub-array comprises a plurality of bit cells, and
bridges disposed in the second sub-array of the two bridges disposed in each of the plurality of power lines are provided along a boundary of the plurality of bit cells.

12. The integrated circuit of claim 8, wherein the second sub-array further comprises a plurality of bridges spaced apart from each other along the second direction and electrically connecting the first metal wiring and the third metal wiring, and the plurality of power lines.

13. The integrated circuit of claim 12, wherein the second sub-array further comprises a second cutting portion repeatedly cutting the first metal wiring constituting the plurality of bit lines, and the plurality of power lines, in the second direction at regular intervals.

14. The integrated circuit of claim 8, wherein the second sub-array further comprises a second cutting portion cutting the third metal wiring such that the third metal wiring constituting the plurality of power lines is included only in the first sub-array.

15. An integrated circuit comprising:
a first sub-array comprising a first structure that comprises a static random access memory (SRAM) cell and a second structure;
a second sub-array neighboring the first sub-array in a second direction;
a multiplexer portion configured to transmit signals to the first sub-array and the second sub-array according to a column address and a sub-array address;
a plurality of first metal wirings spaced apart from each other along a first direction, and extending through the first structure and the second structure in a second direction perpendicular to the first direction, each of the plurality of first metal wirings comprising a first portion and a second portion that is separated from the first portion by a first cutting portion;
a third metal wiring formed above the plurality of first metal wirings and extending in the second direction through the first structure and the second structure, and at least partially overlapping the plurality of first metal wirings along a third direction perpendicular to the first direction and the second direction;
a first bridge formed in the second structure between the plurality of first metal wirings and the third metal wiring, and electrically connecting a first metal wiring among the plurality of first metal wirings to the third metal wiring; and
a second bridge electrically connecting the first metal wiring to the third metal wiring.

16. The integrated circuit of claim 15, wherein the second sub-array comprises the first structure and a third structure comprising an SRAM cell,
wherein the plurality of first metal wirings extend in the second direction through the third structure;
wherein the third metal wiring extends in the second direction through the third structure, and
wherein the second bridge is provided in the third structure at a boundary of SRAM cells, and is formed in a stack structure between the plurality of first metal wirings and the third metal wiring.

17. The integrated circuit of claim 15, wherein the second sub-array comprises a plurality of third structures repeatedly provided in the second direction,
wherein each of the plurality of third structures comprises an SRAM cell,
wherein the plurality of first metal wirings extend through each of the plurality of third structures,
wherein the third metal wiring extends through each of the plurality of third structures, and
wherein the second bridge is provided in the plurality of third structures at a boundary of SRAM cells, and is formed in a stack structure between the plurality of first metal wirings and the third metal wiring.

18. The integrated circuit of claim 15, wherein the second sub-array comprises a plurality of fourth structures repeatedly provided in the second direction,
wherein each of the plurality of fourth structures comprises an SRAM cell,
wherein each of the plurality of first metal wirings comprises a plurality of portions respectively provided in the plurality of fourth structures and separated from each other by a plurality of second cutting portions,
wherein the third metal wiring extends through each of the plurality of fourth structures, and
wherein the second bridge is provided in the each of the plurality of fourth structures at a boundary of SRAM cells, and is formed in a stack structure between the plurality of first metal wirings and the third metal wiring.

19. The integrated circuit of claim 15, wherein the first bridge comprises:
a first via formed on the plurality of first metal wirings;
a second metal wiring formed on the first via, and farther in the first direction than the first via; and
a second via formed on the second metal wiring.

20. An integrated circuit comprising:
a first metal wiring of a word line extending in a first direction through a first segment and a second segment of the integrated circuit, the first metal wiring comprising a first portion and a second portion that is separated from the first portion by a first cutting portion;
a second metal wiring of the word line extending in the first direction, and at least partially overlapping the first metal wiring along a second direction perpendicular to the first direction; and
two bridges formed in a stack structure between the first metal wiring and the second metal wiring, and electrically connecting the first metal wiring to the second metal wiring at both ends of the second segment.

* * * * *